United States Patent
Matsumoto

(10) Patent No.: US 7,633,236 B2
(45) Date of Patent: Dec. 15, 2009

(54) LAMP LIGHTING APPARATUS

(75) Inventor: Shigeyoshi Matsumoto, Hyogo (JP)

(73) Assignee: Ushio Denki Kabushiki Kaisha, Tokyo (JP)

( * ) Notice: Subject to any disclaimer, the term of this patent is extended or adjusted under 35 U.S.C. 154(b) by 447 days.

(21) Appl. No.: 11/730,315

(22) Filed: Mar. 30, 2007

(65) Prior Publication Data
US 2007/0228992 A1    Oct. 4, 2007

(30) Foreign Application Priority Data
Mar. 31, 2006  (JP) ............. D2006-099551
Jan. 29, 2007  (JP) ............. D2007-018539

(51) Int. Cl.
*H05B 37/02*    (2006.01)

(52) U.S. Cl. ............ 315/209 R; 315/219; 315/246; 315/260; 315/224

(58) Field of Classification Search ......... 315/209 R, 315/224, 246–248, 225, 291, 307, 219, 260, 315/276
See application file for complete search history.

(56) References Cited

U.S. PATENT DOCUMENTS

| | | | |
|---|---|---|---|
| 6,356,033 B1 * | 3/2002 | Okamoto et al. | 315/209 R |
| 6,445,137 B1 * | 9/2002 | Okamoto et al. | 315/260 |
| 6,646,391 B2 * | 11/2003 | Okamoto et al. | 315/246 |
| 6,850,016 B2 * | 2/2005 | Oda et al. | 315/224 |
| 7,397,199 B2 * | 7/2008 | Kobayashi | 315/291 |
| 2007/0115088 A1 * | 5/2007 | Sugioka | 336/232 |

FOREIGN PATENT DOCUMENTS

| | | |
|---|---|---|
| JP | 06-163008 A | 6/1994 |
| JP | 3149780 B2 | 1/2001 |
| JP | 2004-510302 A | 4/2004 |

* cited by examiner

*Primary Examiner*—Douglas W Owens
*Assistant Examiner*—Ephrem Alemu
(74) *Attorney, Agent, or Firm*—Rader, Fishman & Grauer, PLLC

(57) ABSTRACT

A lamp lighting apparatus comprises a glass tube, electrodes provided in an axis direction of the glass tube, and an inverter circuit which apply a high voltage of an alternating current to the electrodes. The inverter circuit includes an inverter control circuit which outputs a switching element operating signal, a switching element circuit which converts a direct current voltage into an alternating voltage by ON/OFF controlling the switching element according to the switching element operating signal, and a boosting transformer which boosts the alternating voltage from the switching circuit. In the lighting apparatus, a frequency of the switching element operating signal is higher than that in a steady state operating period, during at least part of period from a beginning of lighting according to the burst light control until the lamp emits light entirely, approximately in the axis direction of the lamp.

27 Claims, 22 Drawing Sheets

○ : Flickering
× : No flickering

| Lighting frequency increase | | No increase | Increase | No increase | Increase |
|---|---|---|---|---|---|
| Inverter duty ratio increase | | No increase | No increase | Increase | Increase |
| Light control duty ratio | 100% | ○ | ○ | ○ | ○ |
| | 90% | ○ | ○ | ○ | ○ |
| | 80% | ○ | ○ | ○ | ○ |
| | 70% | ○ | ○ | ○ | ○ |
| | 60% | ○ | ○ | ○ | ○ |
| | 50% | ○ | ○ | ○ | ○ |
| | 40% | × | ○ | ○ | ○ |
| | 30% | × | ○ | ○ | ○ |
| | 20% | × | × | × | ○ |
| | 10% | × | × | × | ○ |
| Delay time (μs) | | 200~400 | 130~270 | 120~240 | 50~90 |

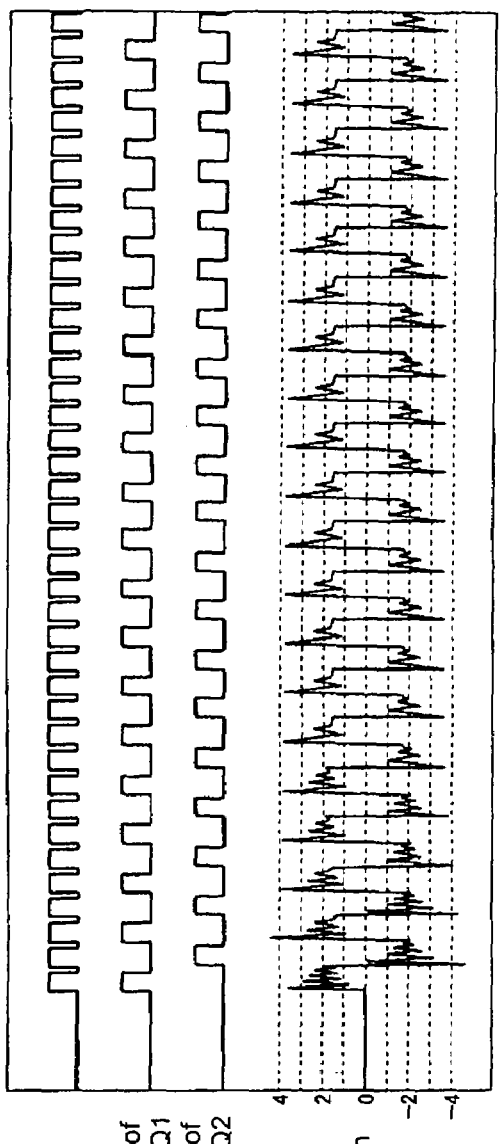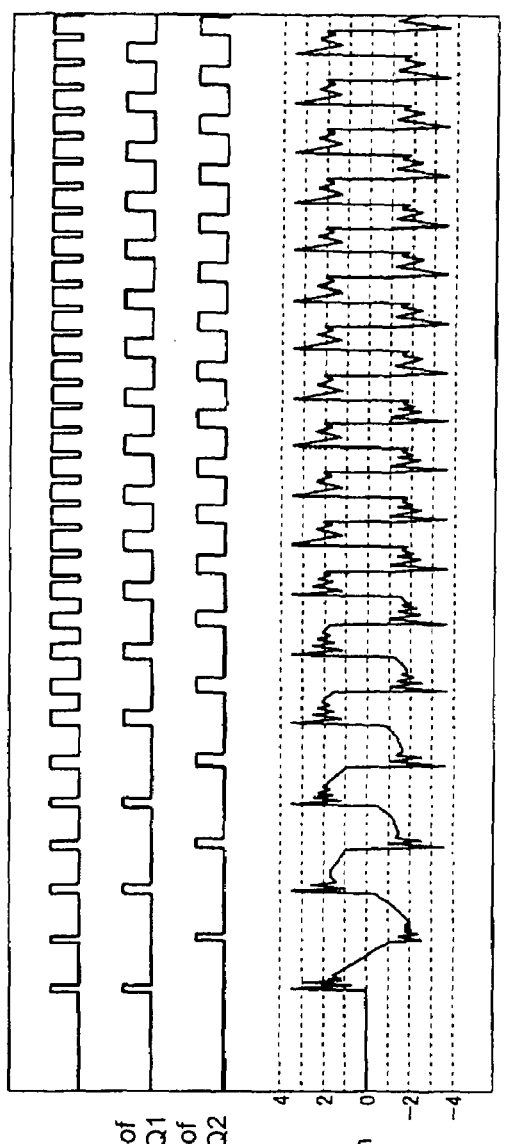

LAMP LIGHTING APPARATUS

CROSS-REFERENCES TO RELATED APPLICATION

This application claims priority from Japanese Patent Application Serial Nos. 2006-99551 filed on Mar. 31, 2006, and 2007-018539 filed on Jan. 29, 2007, the contents of which are incorporated herein by reference in their entireties.

TECHNICAL FIELD

Described herein is a lamp lighting apparatus used for back light of a liquid crystal display panel, lighting, etc.

BACKGROUND

Many cold cathode fluorescence lamps and hot cathode fluorescence lamps are used as a light source for back light of a liquid crystal display panel or a lamp for lighting. A very small amount of mercury is enclosed in these lamps, in which light is emitted from a phosphor due to ultraviolet rays generated from the mercury excited by electric discharge, and they are excellent in terms of high brightness and efficient luminescence.

However, a new light source which does not contain mercury is desired from a viewpoint of prevention of environmental pollution. In a proposed fluorescence lamp which does not contain mercury, two or more belt-like electrodes are disposed on the external surface of a glass tube, and high-frequency high-voltage boosted by a boosting transformer is impressed to these electrodes so as to turn on the rare gas fluorescence lamp. As disclosed in Japanese Patent No. 3,149,780, in such a rare gas fluorescence lamp, an initiation assisting portion for assisting initiation of the rare gas fluorescence lamp is formed, by applying, for example, a conductive substance to the interior of a glass tube end portion.

Moreover, in an external electrode type rare gas fluorescence lamp which is turned on by impressing high-frequency high-voltage thereto, as disclosed in Japanese Laid Open Patent No. H06-163008, the lamp voltage waveform impressed to the electrode is not sinusoidal voltage but voltage including steep voltage changes like a rectangle waveform voltage, so that the light emitting efficiency may be improved.

Generally, the brightness of the screen of a liquid crystal display panel equipped with such a rare gas fluorescence lamp can be adjusted according to surrounding brightness, preference of a user, and/or image information, etc. Adjustment of the brightness on the screen is performed by controlling a back light. In general, the back light is controlled by burst light control. Moreover, also in a lighting use, for example, indirect illumination, in order to adjust the brightness matched with the use environment, a wide range of light adjustment is required. In those cases, burst light control is used in general, as in case of the back light. The burst light control is also called duty light control, in which a cycle of lighting and non-lighting is repeated at a frequency of 60 Hz or higher, and the lighting and non-lighting are periodically repeated at a frequency in a range of approximately 60 to 1 KHz so that the ratio of lighting time and non-lighting time is controlled so as to adjust light The light control frequency is selected from a range of about 60-300 Hz in the case of the liquid crystal back light, and about 1 kHz in the case of a lighting use. The frequency is not limited thereto and can be chosen from the range in which man's eyes cannot recognize it.

SUMMARY

An example of burst light control of a lamp 1 is explained, referring to FIG. 14. The figure shows a burst light controlling signal, an optical output at a measurement point A, and an optical output at a measurement point B.

In the rare gas fluorescence lamp 1 in which an initiation assisting portion 15 is provided, wherein a point near the initiation assisting portion 15 is named as the measurement point A, and a point distant from the initiation assisting portion 15 is named as the measurement point B, the optical outputs of the measurement points A and B are measured when burst light control lighting is carried out. In an early stage of a lighting period, although light emission begins immediately at the measurement point A, light emission at the measurement point B begins later than that.

The cause of the delay of the light emission timing at the measurement point B from that at the measurement point A is considered as set forth below. Electric discharge of the rare gas fluorescence lamp 1 is generated at a moment when a steep voltage change occurs at time of reversion of the polarity of applied voltage, and then stops until the next steep voltage change occurs, and the cycle is repeated. Moreover, electric discharge tends to be produced in the rare gas fluorescence lamp 1 due to accumulation of electric charges on the inner surface of a glass tube 11 which corresponds to a portion where the electrode(s) is disposed. In an early stage of a lighting period, although the starting point of electric discharge is generated at the initiation assisting portion 15, since most electric charges accumulated on the inner surface of the glass tube 11 have disappeared during the non-lighting period, the electric discharge does not spread in the entire rare gas fluorescence lamp 1, but is generated only around the initiation assisting portion 15. However, in the area where the electric discharge has been generated, since an electric charge is accumulated on the inner surface of the glass tube 11, electric discharge occurs easily in the following electric discharge cycle, so that it serves as a starting point, and then electric discharge is also generated therearound.

Thus, electric discharge spreads in the entire rare gas fluorescence lamp 1 by repeating the electric discharge cycle, several times. A period required in order to repeat this electric discharge cycle serves as delay of light emission at the measurement point B. Moreover, in an early stage of a lighting period, since electric discharge is not fully formed, the capacitance component of the rare gas fluorescence lamp 1 becomes small. Since a flat portion of a lamp voltage waveform is regarded as part of a resonance waveform of an inductance and capacitance components of the lamp and the transformer connected to the lamp, when the capacitance component of the rare gas fluorescence lamp 1 is small, the voltage waveform has large attenuation of the flat portion. Consequently, since the steep voltage change at the time of polarity change becomes small so that the energy supplied to the rare gas fluorescence lamp 1 becomes small, the delay of light emission at the measurement point B becomes large.

Due to such a cause, it takes time for the electric discharge generated at the initiation assisting portion 15 in an early stage of the lighting period in the cycle of burst light control to spread entirely in the axial direction of the rare gas fluorescence lamp 1. Therefore, as shown in FIG. 14, in an early stage of a lighting period, light emission begins immediately at the measurement point A, but light emission begins later than that at the measurement point B. On the other hand, at the end of a lighting period, since the entire electric discharge of the rare gas fluorescence lamp 1 stops almost simultaneously, light emission at the measurement points A and B stops simultaneously. Therefore, the light emission time at the measurement point B within the lighting period is shorter by the above-mentioned delay time of the light emission. The brightness at the measurement point B becomes lower than that at measurement point A, and the uniformity of the luminance distribution in the axial direction of the rare gas fluorescence lamp 1 is deteriorated. Moreover, the delay time of light emission at the measurement point B varies by about ±40% of the average range. Therefore, the brightness at the measurement point B changes for every cycle of the burst light control, and flickering occurs near the measurement point B.

Described herein is a lamp lighting apparatus in which the uniformity of the luminance distribution of a lamp in an axial direction, is maintained even though light is reduced according to light control, so that flickering can be controlled.

The present lamp lighting apparatus comprises a glass tube; and an inverter circuit which apply a high voltage of an alternating current to the electrodes, wherein the inverter circuit includes an inverter control circuit which outputs a switching element operating signal; a switching element circuit which converts a direct current voltage into an alternating voltage by ON/OFF controlling the switching element according to the switching element operating signal; and a boosting transformer which boosts the alternating voltage from the switching circuit, wherein a burst light control is carried out, by repeating a cycle of lighting and lighting off of the lamp and controlling a ratio of a lighting period and a non-lighting period, and wherein a frequency of the switching element operating signal is higher than that in a steady state operating period, during at least part of period from a beginning of lighting according to the burst light control until the lamp emits light entirely, approximately in the axis direction of the lamp.

In the lamp lighting apparatus, the frequency of the switching element operating signal may be gradually increased during an early stage of the at least part of period.

In the lamp lighting, the frequency of the switching element operating signal at a beginning of the at least part of period may be higher than that in the steady state operation period.

In the lamp lighting apparatus, the frequency of the switching element operating signal at a beginning of the at least part of period, may be lower than that in the steady state operation period.

In the lamp lighting apparatus, the frequency may be constant during the at least part of period.

In the lamp lighting apparatus, the higher frequency of the switching element operating signal may be changed to that in the steady stage operation period, before the lamp emits light entirely, approximately in the axis direction of the lamp.

In the lamp lighting apparatus, the higher frequency of the switching element operating signal may be changed to that in the steady stage operation period, after the lamp emits light entirely, approximately in the axis direction of the lamp.

In the lamp lighting apparatus, the higher frequency of the switching element operating signal may be gradually and continuously changed to that in the steady stage operation period during a transition period from the at least part of period to the steady state operation period.

In another aspect of the present invention, a lamp lighting apparatus comprises a glass tube; and an inverter circuit which apply a high voltage of an alternating current to the electrodes, wherein the inverter circuit includes an inverter control circuit which outputs a switching element operating signal; a switching element circuit which converts a direct current voltage into an alternating voltage by ON/OFF controlling the switching element according to the switching element operating signal; and a boosting transformer which boosts the alternating voltage from the switching circuit, wherein a burst light control is carried out, by repeating a cycle of lighting and lighting off of the lamp and controlling a ratio of a lighting period and a non-lighting period, and wherein a duty ratio of the switching element operating signal is higher than that in a steady state operating period, during at least part of period from a beginning of lighting according to the burst light control until the lamp emits light entirely, approximately in the axis direction of the lamp.

In the lamp lighting apparatus, the frequency of the switching element operating signal may be gradually increased during an early stage of the at least part of period.

In the lamp lighting, the frequency of the switching element operating signal at a beginning of the at least part of period may be higher than that in the steady state operation period.

In the lamp lighting apparatus, the frequency of the switching element operating signal at a beginning of the at least part of period, may be lower than that in the steady state operation period.

In the lamp lighting apparatus, the frequency may be constant during the at least part of period.

In the lamp lighting apparatus, the higher frequency of the switching element operating signal may be changed to that in the steady stage operation period, before the lamp emits light entirely, approximately in the axis direction of the lamp.

In the lamp lighting apparatus, the higher frequency of the switching element operating signal may be changed to that in the steady stage operation period, after the lamp emits light entirely, approximately in the axis direction of the lamp.

In the lamp lighting apparatus, the higher frequency of the switching element operating signal may be gradually and continuously changed to that in the steady stage operation period during a transition period from the at least part of period to the steady state operation period.

In still another aspect of the invention, a lamp lighting apparatus comprises a glass tube; electrodes provided in a axis direction of the glass tube; and an inverter circuit which apply a high voltage of an alternating current to the electrodes, wherein the inverter circuit includes an inverter control circuit which outputs a switching element operating signal; a switching element circuit which converts a direct current voltage into an alternating voltage by ON/OFF controlling the switching element according to the switching element operating signal; and a boosting transformer which boosts the alternating voltage from the switching circuit, wherein a burst light control is carried out, by repeating a cycle of lighting and lighting off of the lamp and controlling a ratio of a lighting period and a non-lighting period, and wherein a frequency and a duty ratio of the switching element operating signal are higher than that in a steady state operating period, during at least part of period from a beginning of lighting according to the burst light control until the lamp emits light entirely, approximately in the axis direction of the lamp.

In the lighting apparatus, the frequency of the switching element operating signal may be gradually increased during an early stage of the at least part of period.

In the lamp lighting, the frequency of the switching element operating signal at a beginning of the at least part of period may be higher than that in the steady state operation period.

In the lamp lighting apparatus, the frequency of the switching element operating signal at a beginning of the at least part of period, may be lower than that in the steady state operation period.

In the lamp lighting apparatus, the frequency may be constant during the at least part of period.

In the lamp lighting apparatus, the higher frequency of the switching element operating signal may be changed to that in the steady stage operation period, before the lamp emits light entirely, approximately in the axis direction of the lamp.

In the lamp lighting apparatus, the higher frequency of the switching element operating signal may be changed to that in the steady stage operation period, after the lamp emits light entirely, approximately in the axis direction of the lamp.

In the lamp lighting apparatus, the higher frequency of the switching element operating signal may be gradually and continuously changed to that in the steady stage operation period during a transition period from the at least part of period to the steady state operation period.

According to the present invention, it is possible to accelerate spread of electric discharge in an axial direction of the lamp by increasing the frequency or the duty ratio of a switching element operating signal. Hereby, delay of light emission at a portion distant from the initiation assisting portion can be suppressed, and the uniformity of luminance distribution in the axial direction of the lamp can be maintained. Furthermore, by the suppression of the delay of the light emission, the change of the brightness due to the variation in delay time becomes small, and flickering produced at the portion distant from the initiation assisting portion can be suppressed. Moreover, when a period during which the frequency or the duty ratio of the switching element operating signal is high, shifts to a steady state operation period, by changing continuously (or gradually) and gently but not discontinuously the frequency and/or the duty ratio of the switching element operating signal, the voltage waveform of the lamp is not disturbed, so that it is possible to prevent unstable electric discharge. Moreover, by suppressing surge voltage generated when the frequency or the duty ratio of the switching element operating signal is high, it is possible to provide the lamp lighting apparatus which is excellent in a safety aspect.

Although the present lamp lighting apparatus according to embodiments will be explained, referring to the rare gas fluorescence lamps, it is not limited to such fluorescence lamps in view of maintaining the uniformity of radiance distribution, and preventing high surge voltage. The technology according to the present invention, may be applied to any lamps, as long as electric discharge is generated in an electric discharge container, through at least one dielectrics provided between an electrode and an electric discharge container, and the excimer light generated by the electric discharge is utilized. Furthermore, application of the present invention is not limited to a liquid crystal back light or a lighting purpose.

BRIEF DESCRIPTION OF DRAWINGS

Other features and advantages of the present lamp lighting apparatus will be apparent from the ensuing description, taken in conjunction with the accompanying drawings, in which:

FIGS. 19A and 19B show a switching element operating signal in an early stage of a lighting period of burst light control, and a waveform showing ON/OFF states of switching elements, and a lamp voltage waveform in a rare gas fluorescence lamp lighting apparatus shown in the FIG. 16;

DETAILED DESCRIPTION

Figure 1:
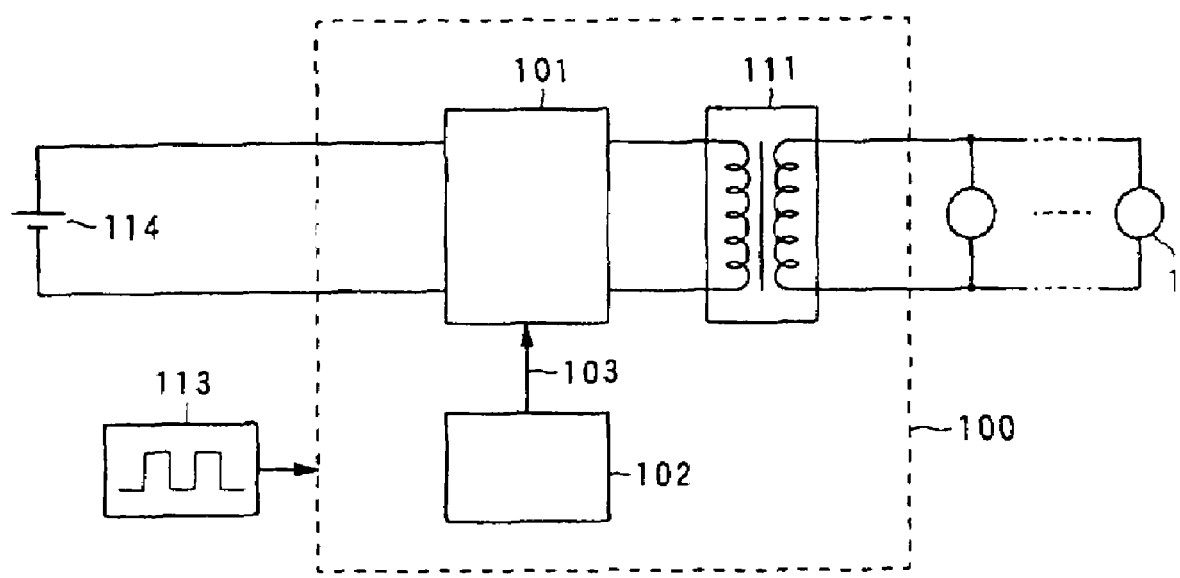
FIG. 1 shows the basic structure of a rare gas fluorescence lamp lighting apparatus which performs burst light control.

Description of an embodiment will be given, referring to FIG. 1. FIG. 1 shows the basic structure of a fluorescence lamp lighting apparatus for carrying out burst light control Although the present lamp lighting apparatus according to embodiments will be explained, referring to a rare gas fluorescence lamp, the lamp is not limited to such fluorescence lamp in view of maintaining the uniformity of radiance distribution, and preventing high surge voltage.

As shown in FIG. 1, in the rare gas fluorescence lamp lighting apparatus, a direct current voltage of tens to hundreds V supplied from a direct-current power source 114 is converted into a high AC voltage of several KV at the frequency of tens of kHz by an inverter circuit 100. The high voltage of the alternating current is impressed as lighting electric power to external electrodes 12 and 13 extending in the axial direction on the external surface of a glass tube 11 of the rare gas fluorescence lamp 1 shown in FIG. 3B.

Figure 3A:
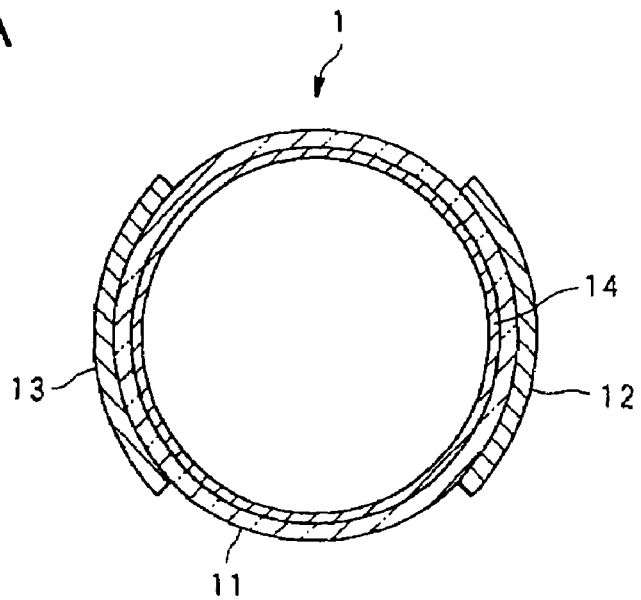
FIGS. 3A and 3B show the structure of a rare gas fluorescence lamp shown in FIG. 2.
Figure 3B:
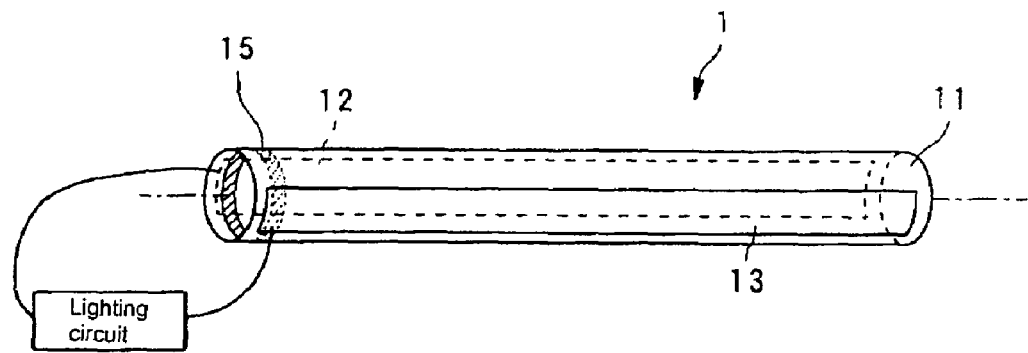

As shown in FIG. 3B, the rare gas fluorescence lamp 1 has a straight-tube shaped outer enclosure which is air-tightly sealed and made from the glass tube 11, and on its external surface, the external electrodes 12 and 13 extending in the axial direction are arranged, and a fluorescent substance is formed inside the glass tube 11. In the rare gas fluorescence lamp, a predetermined amount of rare gas which is at least one of He, Ar, Xe, and the Kr, as a main component, is enclosed therein. Moreover, at least one initiation assisting portion 15 is arranged inside the glass tube 11.

The inverter circuit 100 converts a direct current voltage to a high voltage of an alternating current, and output it to the downstream side. The inverter circuit 100 comprises an inverter control circuit 102, a switching element circuit 101, and a boosting transformer 111. The inverter control circuit 102 outputs a switching element operating signal 103. The switching element operating signal 103 is a periodic pulse signal for carrying out ON/OFF control of switching elements of the switching element circuit 101. The switching element circuit 101 may be formed by a push pull circuit, a half bridge circuit, or a full bridge circuit, etc. By turning on and off the switching elements and the direct current voltage from the direct-current power source 114 is converted into an alternating voltage according to the switching element operating signal 103. The boosting transformer 111 boosts the alternating voltage, so as to turn into an output voltage of the inverter circuit 100. Burst light control is performed by carrying out an intermittent operation of the inverter circuit 100 according to a burst light controlling signal 113.

Figure 2:
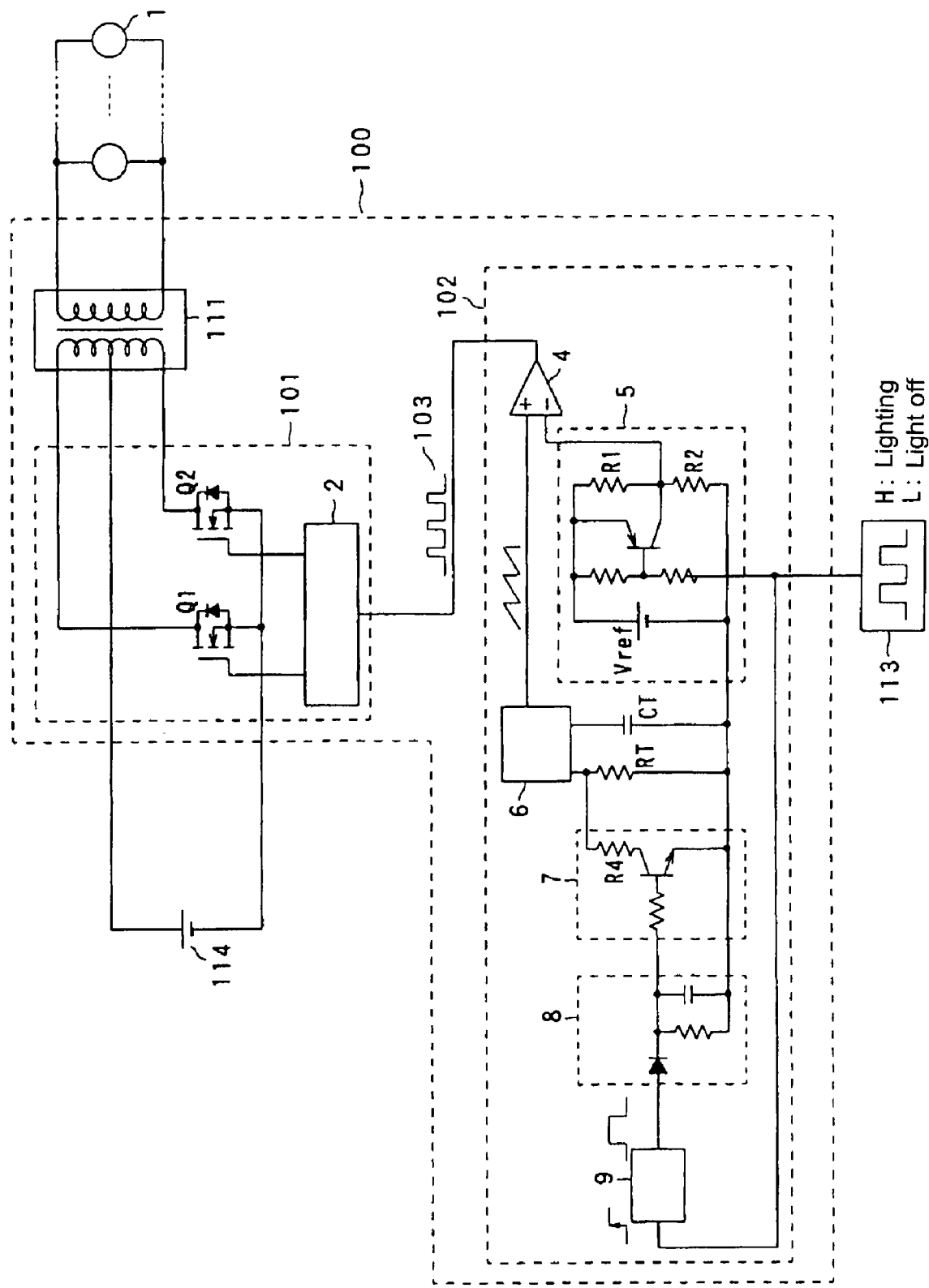
FIG. 2 shows the structure of a rare gas fluorescence lamp lighting apparatus which performs burst light control according to a first embodiment.
Figure 4:
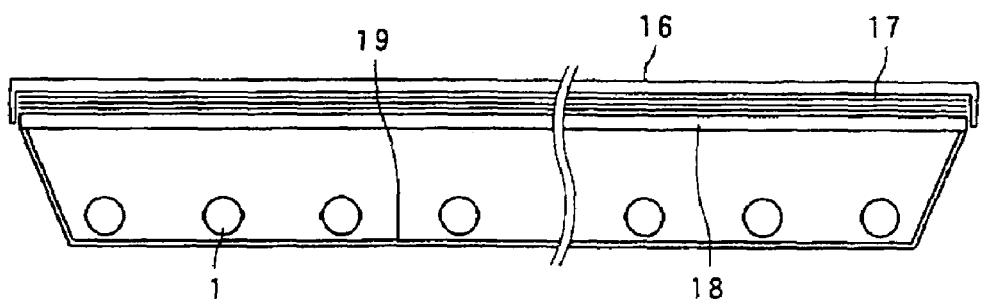
FIG. 4 shows a diagram of a rare gas fluorescence lamp shown in FIG. 2 which is used as a back light source of a liquid crystal panel.
Figure 5:
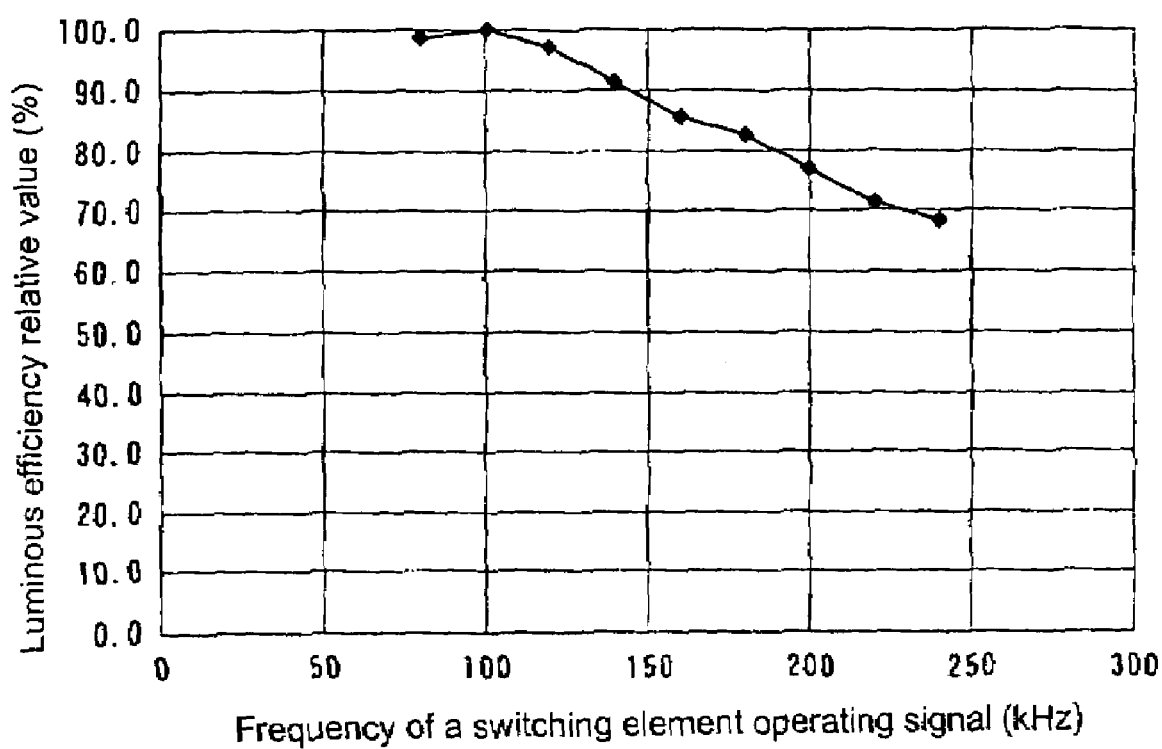
FIG. 5 shows the relation between the frequency of a switching element operating signal, and a luminous efficiency relative value.
Figure 6:
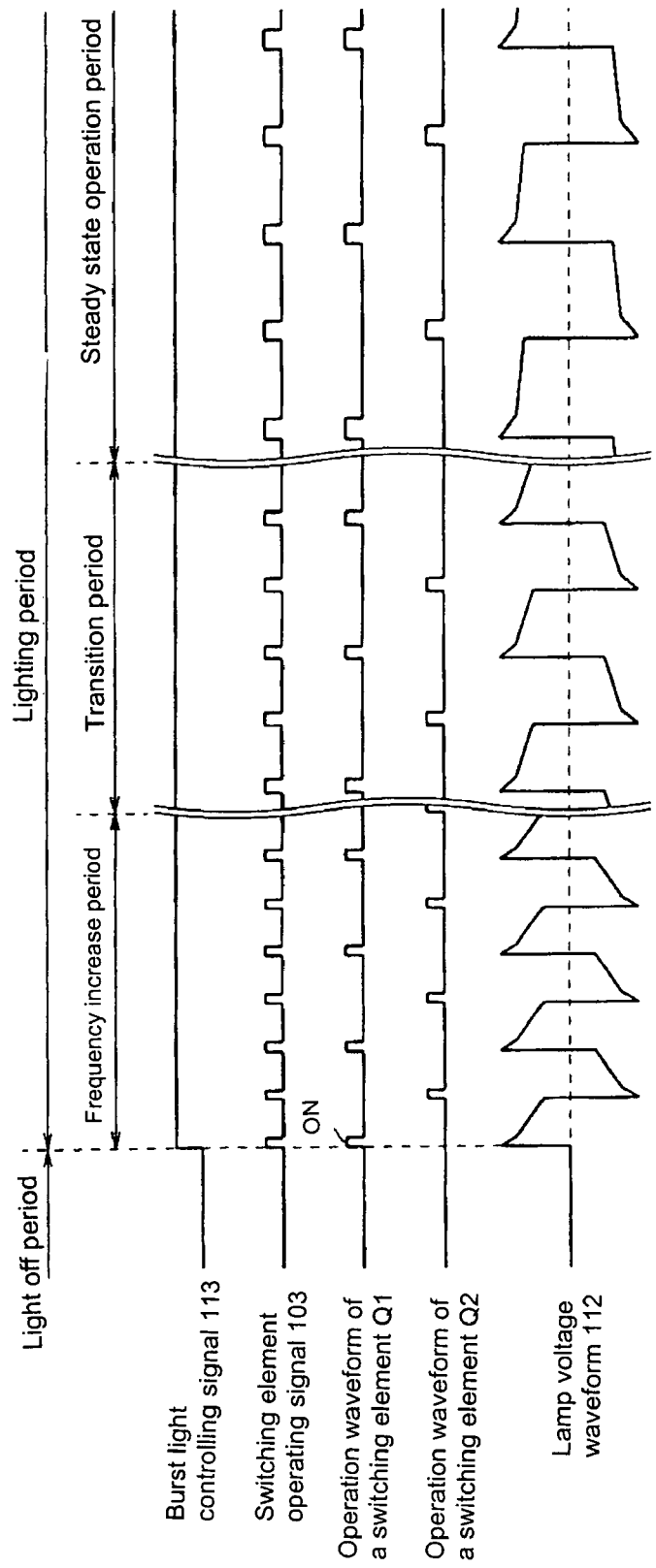
FIG. 6 shows a burst light controlling signal, a switching element operating signal, an operation waveform of a switching element, and a lamp voltage waveform according to a first embodiment.

Description of such a rare gas fluorescence lamp lighting apparatus, according to a first embodiment will be given below, referring to FIGS. 2-6. FIG. 2 shows the structure of the rare gas fluorescence lamp lighting apparatus which performs the burst light control according to the embodiment. FIGS. 3A and 3B show the structure of the rare gas fluorescence lamp 1 shown in FIG. 2. FIG. 4 shows an example in which the rare gas fluorescence lamp 1 shown in FIG. 2 is used as a back light source of a liquid crystal panel. FIG. 5 is a graph showing the relation between the frequency of the switching element operating signal 103 and a luminous efficiency relative value, and FIG. 6 is a time chart showing the burst light controlling signal 113, the switching element operating signal 103, and operation waveforms showing ON/OFF states of the switching elements Q1 and Q2, and a lamp voltage waveform 112.

As shown in FIGS. 3A and 3B, the rare gas fluorescence lamp 1, for example, has the straight-tube shaped outer enclosure which is air-tightly sealed and made from the glass tube 11, and the fluorescent substance 14 which made of phosphors, such as a rare earth phosphor and a halphosphate phosphor, is formed on the inside of the glass tube 11. Although the sealing structure of the glass tube 11 is formed by sealing disk-like sealing glass boards at the both ends of the glass tube 11, it can be formed, for example, by the so-called top sealing in which a diameter shrinkage processing is carried out, so as to melt it while heating the glass tube 11. The external electrodes 12 and 13 are formed at opposite positions by attaching, for example, aluminum tapes cut out in 1 mm width, on the outer surface of the glass tube 11, and face each other so that the central axis of the rare gas fluorescence lamp 1 is between the electrodes 12 and 13. Moreover, for example, the external electrodes 12 and 13 may be formed by carrying out screen-printing and burning of conductive paste. In addition, a predetermined amount of rare gas which is at least one of He, Ar, Xe, and Kr, which do not contain metal steam such as mercury, is enclosed as a main component in the sealed space of the glass tube 11.

At least one initiation assisting portion 15, which is made of a conductive substance or electron emission assisting substance, is arranged inside the glass tube 11 in order to make electrical discharge start easily. The electrical discharge is generated from the initiation assisting portion 15 as a starting point, and spreads in a chain reaction manner from the starting point in the entire rare gas fluorescence lamp 1. Usually, the initiation assisting portion 15 is provided in the end portion etc. of the glass tube 11, so as not to affect the optical extraction efficiency thereof during lighting. The conductive substance includes at least one of a silver, an aluminum, a black lead (a graphite), a tin oxide, an indium oxide, a barium, a nickel, etc., or a mixture of the substances, and a binder can be used if necessary. The electron emission assisting substance includes at least one of a carbon nanotube, a magnesium oxide, a cesium oxide, an aluminum oxide, a zinc oxide, a lead oxide, etc., or a mixture of the substances, and a binder can be used if necessary. Moreover, the shape thereof is not limited specifically to the above examples, and a point shape, or a grain, or a prism shape, pole shape, or a strip shape can be used if necessary. Furthermore, it is possible that not only one but also two of the initiation assisting portions 15 are formed at the end portion of the glass tube 11, and it is also possible to arrange the initiation assisting portion(s) 15 in the portion (s) other than the end portion thereof in view of improving the lamp starting characteristic. Moreover, although the initiation assisting portion 15, for example, is fixed by calcination (burning) at 400 degrees Celsius after applying it to the glass tube 11, the fixing method may be a method of direct welding, or a method of directly applying the initiation assisting portion 15 to the glass material of the inside of the glass tube 11, and a fixing method by adhesives, etc.

Moreover, the lighting starting nature of the initiation assisting portion 15 can be improved by providing a narrowed portion in part of electrical discharge space. The narrowed portion can also be formed by forming, in the glass tube 11, a projection which projects towards the inside thereof. If part of the discharge space is designed so as to be closer to it, than the other part of electrical discharge space, the starting characteristic can be improved when electric discharge is carried out through the electrical discharge space between the external electrodes 12 and 13. Moreover, the narrowed portion can be provided not only at a limited one portion, but also on two or more portions, and further it can be provided in a portion other than the end portion.

As shown in FIG. 4, two or more of the rare gas fluorescence lamps 1 are arranged at approximately equal intervals on the bottom of a metallic case 19 having an open flat face, on which a diffuse reflection sheet such as foamed PET are arranged. And, the opening provided in the front side in the light emitting direction of the case 19 is covered with a diffuser plate 18, an optical film 17, and a liquid crystal panel 16 so as to be formed (laminated) in this order in a light emitting direction. Here, the diffuser plate 18, the optical film 17, and the liquid crystal panel 16 may be made from material which is conventionally and suitably used.

As shown in FIG. 2, in the rare gas fluorescence lamp lighting apparatus, the direct current voltage supplied from the direct-current power source 114 is converted into a high voltage of an alternating current in the inverter circuit 100, so as to be supplied to the rare gas fluorescence lamp 1 as electric power for lighting. Moreover, the inverter circuit 100 carries out an intermittent operation according to the burst light controlling signal 113, so as to perform burst light control. The inverter circuit 100 comprises the boosting transformer 111, the switching element circuit 101, and the inverter control circuit 102. The switching element 101 comprises the switching element Q1, a switching element Q2, and a switching element driving circuit 2, and the inverter control circuit 102 comprises a comparator 4, a reference voltage controlling circuit 5, an oscillating circuit 6, a frequency increasing circuit 7, a delay circuit 8, and a timer circuit 9.

First, description of the inverter control circuit 102 will be given below. The oscillating circuit 6 in the inverter control circuit 102 outputs an oscillation signal in form of a periodic saw waveform, the voltage of which is inputted into the plus terminal of the comparator 4, and a comparison voltage from the reference voltage controlling circuit 5 is inputted into the minus terminal of the comparator 4, in which only when the drive signal of the saw waveform voltage exceeds the comparison voltage, the output voltage of the comparator 4 becomes High. That is, the switching element operating signal 103 which is the output voltage of the comparator 4 becomes (changes to) a pulse waveform in which a duty ratio is changed according to the magnitude of the comparison voltage, and in which when the comparison voltage is smaller, the duty ratio becomes higher, and when the comparison voltage is larger, the duty ratio becomes lower.

When the burst light controlling signal 113 is high, a transistor in the reference voltage controlling circuit 5 is in an OFF state, and the comparison voltage inputted into the minus terminal of the comparator 4 becomes Vref×R2/(R1+R2). This comparison voltage of Vref×R2/(R1+R2) is smaller than the peak voltage of the saw waveform which is the oscillation signal outputted from the oscillating circuit 6. Therefore, the comparator 4 outputs the switching element operating signal 103 in form of a pulse waveform with the duty ratio corresponding to the magnitude of the comparison voltage, thereby turning on the rare gas fluorescence lamp 1.

When the burst light controlling signal 113 is low, the transistor in the reference voltage controlling circuit 5 is turned on, and the comparison voltage becomes almost the same size as Vref. Since the magnitude of Vref is set up so as to be larger than the peak voltage of the saw waveform which is the oscillation signal of the oscillating circuit 6, the switching element operating signal 103 which is the comparator in form of a pulse waveform is not outputted, so that the rare gas fluorescence lamp 1 is turned off.

Furthermore, the inverter control circuit 102 comprises the timer circuit 9 which controls the length of a frequency increase period of the switching element operating signal 103, the delay circuit 8 which continuously changes (in this embodiment, for example, gradually decreases) the frequency of the switching element operating signal 103 from the end of the frequency increase period to a steady state operation period through a transition period, and the frequency increasing circuit 7 which decreases temporarily the value of timing resistance of the oscillating circuit 6, thereby increasing the frequency of the switching element operating signal 103. The frequency of the oscillating circuit 6 is determined by the value of the timing resistance RT and timing capacitance CT, and the timing resistance RT and the oscillation frequency thereof have the relation of an inverse proportion. The burst light controlling signal 113 is inputted into the reference voltage controlling circuit 5 and the timer circuit 9.

When the burst light controlling signal 113 becomes high, the transistor in the reference voltage controlling circuit 5 is turned off, and at the same time, the output of the timer circuit 9 becomes high. And the capacitor of the delay circuit 8 is charged immediately so that a transistor of the frequency increasing circuit 7 is turned on. Consequently, the timing resistance of the oscillating circuit 6 becomes the size of the parallel resistance of R4 and RT, so that the operating frequency of the switching element operating signal 103 which is in an inverse proportion to the timing resistance is increased.

Next, when setup time of the timer circuit 9 elapses, the output of the timer circuit 9 becomes low. The setup time of the timer circuit 9 is set to time period required for the entire light emission of the rare gas fluorescence lamp 1. The "entire light emission" means that the rare gas fluorescence lamp 1 emits light entirely approximately in the axial direction. The time period, from the beginning of burst light control to the end of the entire light emission is obtained by experiments beforehand.

When the output of the timer circuit 9 becomes low, the capacitor voltage of the delay circuit 8 falls gradually according to the time constant of the capacitor and a resistor, and the resistance between the collector and emitter of the transistor of the frequency increasing circuit 7 becomes larger gradually, and the frequency thereof decreases gently and continuously. When the transistor 7 is completely turned off, since the timing resistance becomes the resistance RT, the operating frequency of the switching element operating signal 103 returns to that in a steady state. Thus, a transition period from a state in which the operating frequency of the switching element operating signal 103 is increased, to a state where the frequency thereof is gradually decreased so as to return to the steady state (regular size of the frequency in a steady state), is suitably set up by the time constant of the capacitor and resistor which form the delay circuit 8.

Then, description of the switching element circuit 101 and the boosting transformer 111 will be given below. The switching element operating signal 103 is inputted into the switching element driving circuit 2 in the switching element circuit

101. If the switching element operating signal 103 becomes high, the switching element driving circuit 2 turns on either the switching element Q1 or Q2. Then, if the switching element operating signal 103 becomes low, both of the switching elements Q1 and Q2 are turned off. After that, if the switching element operating signal 103 becomes high, the other switching element, which was not turned on last time, is turned on. By repeating such a switching operation, the polarity of the voltage which is applied to the primary side of the boosting transformer 111 is reversed periodically, and a high voltage of an alternating current is generated in the secondary side of the boosting transformer 111.

A cycle of electric discharge of the rare gas fluorescence lamp 1 is repeated, in which the electric discharge is generated at a moment at which the polarity of the applied voltage is reversed so that the steep voltage change occurs, and the electrical discharge is not generated until the next steep voltage occurs. After the base (starting) point of electric discharge occurs at the initiation assisting portion 15, it is necessary to repeat the electric discharge cycle two or more times to extend the electric discharge entirely. Therefore, the frequency of the switching element operating signal 103 is increased so that the number of times of the electric discharge cycles per unit time is increased, and a spread of electric discharge can be accelerated.

Accordingly, the delay of light emission at a portion distant from the initiation assisting portion 15 can be controlled, and the uniformity of the luminance distribution of the rare gas fluorescence lamp 1 in the axial direction can be maintained. Furthermore, the delay of light emission is suppressed so that the variation in delay time may become small. Therefore, the change of the brightness due to the variation in delay time becomes small, and the flickering produced at the portion distant from the initiation assisting portion 15 can be suppressed.

FIG. 5 is a graph showing the relation between the frequency of the switching element operating signal 103 and the luminous efficiency relative value of the rare gas fluorescence lamp 1.

As shown in FIG. 5, since the luminous efficiency becomes the maximum when the frequency of the switching element operating signal 103 is 100 kHz, it is desirable to perform a steady state operation around at 100 kHz. In case of increasing the frequency of the signal 103, when the state in which the frequency is increased, continues for a long time beyond necessity, the entire luminous efficiency falls since the frequency thereof temporarily gets out of the range in which the luminous efficiency thereof is high. Therefore, the length of the frequency increase period of the switching element operating signal 103 can be maintained so as to be the length of a period from the beginning of lighting according to burst light control until the rare gas fluorescence lamp 1 emits light entirely, approximately in the axial direction, so that the decline in luminous efficiency can be controlled to the minimum.

Moreover, when the frequency of the switching element operating signal 103 is discontinuously changed from the increase period to the regular operation period (steady state operation) period, there is a possibility that the voltage waveform of the rare gas fluorescence lamp 1 may be disturbed, so that electric discharge may become unstable. Therefore, when shifting to the steady state operation period from the frequency increase period of the switching element operating signal 103, by providing the delay circuit 8 as shown in FIG. 2, the frequency is changed moderately or gently and continuously during the transition period so that the voltage can be supplied consistently (stably), and the voltage waveform of the rare gas fluorescence lamp 1 cannot be disturbed, thereby preventing instability of electric discharge.

FIG. 6 shows waveforms of the burst light controlling signal 113, the switching element operating signal 103, operation waveforms showing ON/OFF states of switching elements Q1 and Q2, and the lamp voltage waveform 112 during a period from the beginning of the lighting according to burst light control to the steady state operation period through the frequency increase period and the transition period.

The switching elements Q1 and Q2 are alternatively turned on according to an operation of the switching element driving circuit 2 into which the switching element operating signal 103 is inputted. The polarity of the lamp voltage waveform 112 is changed so that a steep voltage change occurs, every time the switching element Q1 or Q2 is turned on. During the frequency increase period from the beginning of the lighting based on the burst light controlling signal 113 until the rare gas fluorescence lamp 1 emits light entirely, approximately in the axial direction, the frequency of the switching element operating signal 103 is increased (or the frequency thereof becomes high), so that the frequency at which steep voltage changes of the lamp voltage waveform 112 occur, is increased. Then, it enters into the transition period during which the frequency of the switching element operating signal 103 is changed continuously (or gradually) and gently. In a steady state operation period, the frequency of the switching element operating signal 103 returns to the steady state frequency, so that the frequency, at which a steep voltage change of the lamp voltage waveform 112 occurs, also returns to that in a steady state.

As mentioned above, in the rare gas fluorescence lamp lighting apparatus according to the present embodiment, during the period from the beginning of the lighting period of burst light control until the rare gas fluorescence lamp 1 emits light entirely, approximately in the axial direction, the frequency of the switching element operating signal 103 is increased, and the frequency thereof is changed from a high frequency state to that in the steady state through the transition period during which the frequency of the switching element operating signal 103 is continuously (or gradually) and gently returned to a steady state.

In such a manner, in a certain period of an early stage of a lamp lighting (period) according to the burst light control, the number of times of steep voltage changes in the lamp voltage waveform 112 per unit time is increased so that a spread of electric discharge can be accelerated thereby controlling (suppressing) the delay of light emission at a portion distant from the initiation assisting portion 15, and maintaining the uniformity of the axial direction luminance distribution of the rare gas fluorescence lamp 1.

Furthermore, since the delay of light emission is suppressed, the variation in delay time may become small, and the flickering produced at the portion distant from the initiation assisting portion 15 can be suppressed. Moreover, since the frequency of the switching element operating signal 103 is continuously (or gradually) and gently changed from high to low, the voltage waveform of the rare gas fluorescence lamp 1 cannot be disturbed, whereby electric discharge does not become unstable.

Next, a second embodiment will be described, referring to FIG. 7-9.

Figure 7:
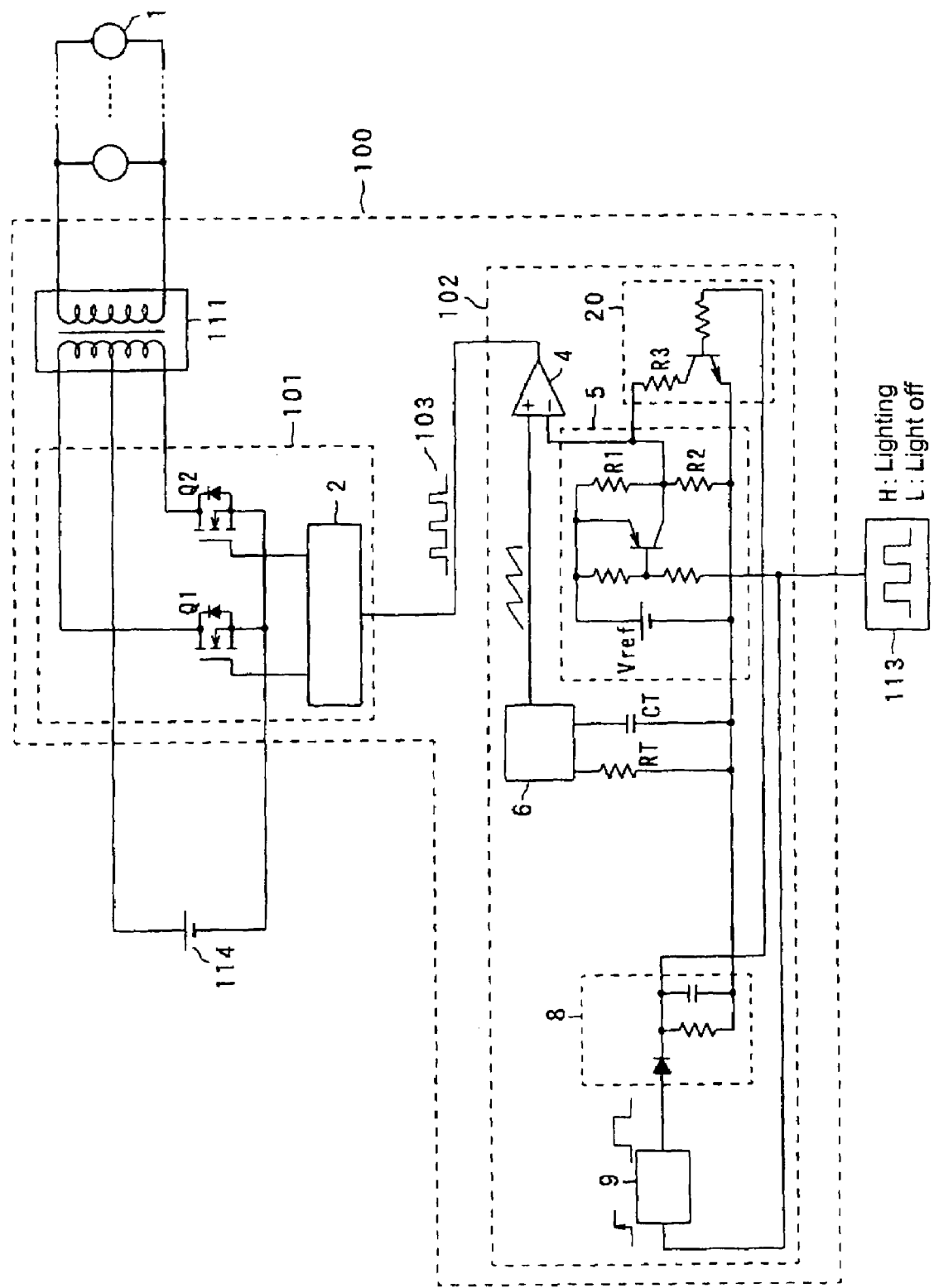
FIG. 7 shows the structure of a rare gas fluorescence lamp lighting apparatus which performs burst light control according to a second embodiment.

FIG. 7 shows the structure of a rare gas fluorescence lamp lighting apparatus which performs burst light control according to the present embodiment. FIG. 8 is a graph showing the relation between the duty ratio of a switching element operating signal 103 and a luminous efficiency relative value. FIG.

9 shows waveforms of a burst light controlling signal 113 and the switching element operating signal 103, operation waveforms showing ON/OFF states of switching elements Q1 and Q2, and a lamp voltage waveform 112.

Since the structure of the rare gas fluorescence lamp 1 is the same as that of the first embodiment, description thereof is omitted. As shown in an FIG. 7, in the rare gas fluorescence lamp lighting apparatus, a direct current voltage supplied from a direct-current power source 114 is converted into a high voltage of an alternating current in an inverter circuit 100, and is supplied to the rare gas fluorescence lamp 1 as lighting electric power. Moreover, in the inverter circuit 100, an intermittent operation is carried out according to the burst light controlling signal 113, so as to perform the burst light control. The inverter circuit 100 comprises a boosting transformer 111, a switching element circuit 101, and an inverter control circuit 102. Moreover, the switching element circuit 101 comprises a switching element Q1, a switching element Q2, and a switching element driving circuit 2. The inverter control circuit 102 comprises a comparator 4, a reference voltage controlling circuit 5, an oscillating circuit 6, a delay circuit 8, a timer circuit 9, and a switching element duty ratio increasing circuit 20.

First, description of the inverter control circuit 102 will be given. The oscillating circuit 6 in the inverter control circuit 102 outputs an oscillation signal in form of a periodic saw waveform, and the voltage of the saw waveform is inputted into the plus terminal of the comparator 4. A comparison voltage from the reference voltage controlling circuit 5 is inputted into the minus terminal of the comparator. Only when the drive signal in the form of the voltage of a saw waveform exceeds the comparison voltage, the output voltage of the comparator 4 becomes high. That is, the switching element operating signal 103 which is the output voltage of the comparator 4 becomes a pulse waveform whose duty ratio is changed according to the magnitude of the comparison voltage, in which the smaller the comparison voltage becomes, the larger the duty ratio becomes, and the larger the comparison voltage becomes, the smaller the duty ratio becomes.

When the burst light controlling signal 113 is high, a transistor in the reference voltage controlling circuit 5 is in an OFF state, and the comparison voltage inputted into the minus terminal of the comparator 4 becomes Vref×R2/(R1+R2). This comparison voltage Vref×R2/(R1+R2) is smaller than the peak voltage of the saw waveform which is the oscillation signal of the oscillating circuit 6. Therefore, the comparator 4 outputs the switching element operating signal 103 in form of the pulse waveform with the duty ratio corresponding to the value of this comparison voltage, so as to turn on the rare gas fluorescence lamp 1. When the burst light controlling signal 113 is low, the transistor in the reference voltage controlling circuit 5 is turned on, and the comparison voltage becomes almost the same as Vref. Since the magnitude of Vref is set up so as to be larger than the peak voltage of the saw waveform which is the output signal of the oscillating circuit 6, the switching element operating signal 103, which is the pulse waveform output of the comparator 4, is not outputted, so that the rare gas fluorescence lamp 1 is turned off.

Furthermore, the inverter control circuit 102 comprises the timer circuit 9 which controls the length of the duty ratio increase period of the switching element operating signal 103, the delay circuit 8 which continuously changes the duty ratio of the switching element operating signal 103 from the end of a frequency increase period to a steady state operation period through a transition period, and the switching element duty ratio increasing circuit 20, which temporarily decreases the comparison voltage inputted into the comparator 4 so as to increase the duty ratio of the switching element operating signal 103. The burst light controlling signal 113 is inputted into the reference voltage controlling circuit 5 and the timer circuit 9.

When the burst light controlling signal 113 becomes high, the transistor in the reference voltage controlling circuit 5 is turned off, and at the same time, the output of the timer circuit 9 becomes high. And a capacitor of the delay circuit 8 is charged immediately and a transistor of the switching element duty ratio increasing circuit 20 is turned on. Consequently, the comparison voltage inputted into the minus terminal of the comparator 4 falls, and the duty ratio of the switching element operating signal 103 is increased. Next, when the setup time of the timer circuit 9 elapses, the output of the timer circuit 9 becomes low. The setup time of the timer circuit 9 is set to a time period required for completion of the entire light emission, that is a period from the beginning of lighting according to the burst light control until the rare gas fluorescence lamp 1 emits light entirely, approximately in the axial direction. The time period is obtained by experiments beforehand.

When the output of the timer circuit 9 becomes low, the voltage of the capacitor in the delay circuit 8 falls gradually according to the time constant of the capacitor and the resistor, and the resistance between the collector and emitter of the transistor of the switching element duty ratio increasing circuit 20 becomes larger gradually, so that the duty ratio thereof decreases gently and continuously. Since the comparison voltage becomes Vref×R2/(R1+R2) when the transistor of the switching element duty ratio increasing circuit 20 is completely turned off, the duty ratio of the switching element operating signal 103 returns to a steady state duty ratio. Thus, a transition period from a state in which the duty ratio of the switching element operating signal 103 is increased (becomes high) to a state where the frequency thereof is decreased gradually so as to return to a steady state, is suitably set up by the time constant of the capacitor and a resistor which forms the delay circuit 8.

Description of the switching element circuit 101 and the boosting transformer 111 is omitted, since they are the same as those of the first embodiment.

In case of lighting by a rectangle waveform voltage, since electric discharge is not fully formed, for example if it is immediately after the starting point of electric discharge is generated at the initiation assisting portion 15, the capacitance component of the rare gas fluorescence lamp 1 is small, so that the lamp voltage waveform 112 turns into a waveform with large attenuation at flat portions of a rectangle voltage waveform. However, by increasing the duty ratio of the switching element operating signal 103 in a certain period in an early stage of the burst light control lighting period, even if electric discharge is not fully formed, attenuation of the flat portion of the lamp voltage waveform 112 can be controlled. Consequently, the size of the steep voltage changes is secured, when the polarity thereof changes, so that the lamp voltage waveform 112, capable of supplying sufficient energy to the rare gas fluorescence lamp 1, can be formed, and a spread of electric discharge can be accelerated.

In such a manner, the delay of light emission at a portion distant from the initiation assisting portion 15 can be controlled (suppressed), and the uniformity of the luminance distribution of the rare gas fluorescence lamp 1 in the axial direction thereof can be maintained. Furthermore, since the delay of light emission is suppressed, the variation in delay time becomes small, and the flickering produced at the portion distant from the initiation assisting portion 15 can be suppressed.

Figure 8:
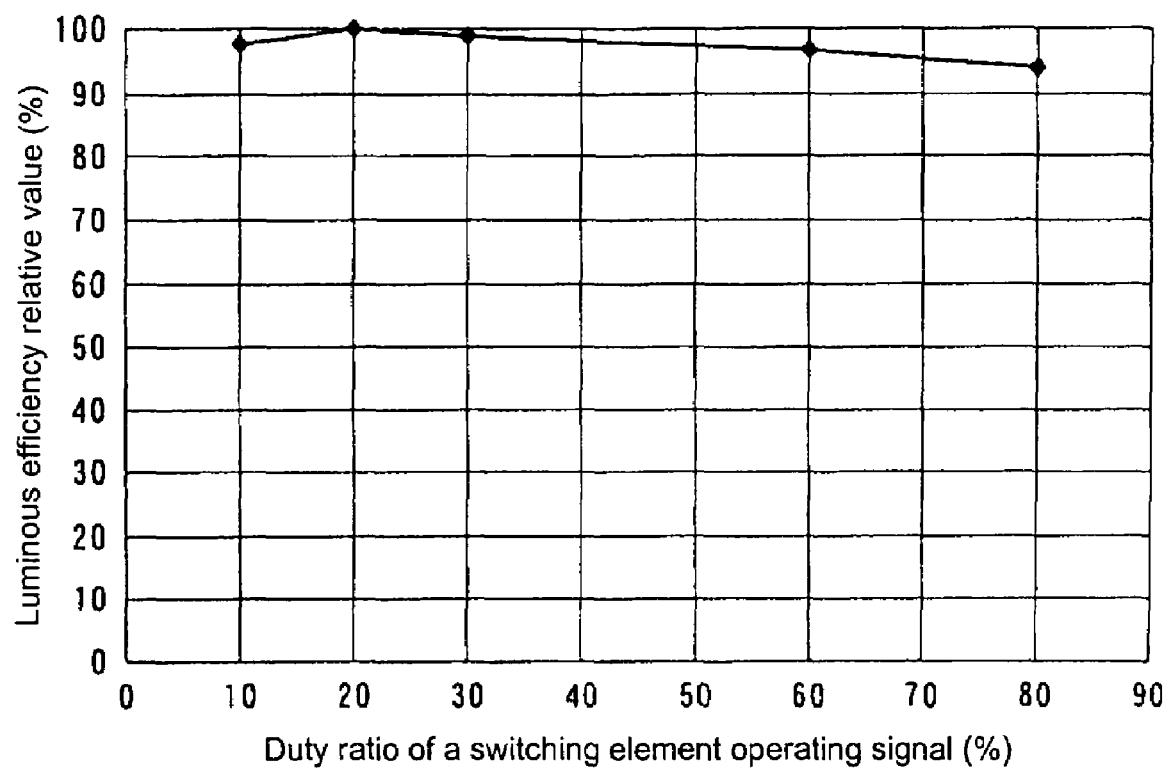
FIG. 8 shows the relation between the duty ratio of a switching element operating signal, and a luminous efficiency relative value.

FIG. 8 is a graph showing the relation between the duty ratio of the switching element operating signal 103 and a luminous efficiency relative value. As shown in FIG. 8, since the luminous efficiency becomes the maximum when the duty ratio of the switching element operating signal 103 is 20%, it is desirable to perform a steady state operation at about 20% duty ratio.

In case that the duty ratio is increased, when a state where the duty ratio is increased, continues for a long time beyond necessity, the entire luminous efficiency falls since the duty ratio thereof temporarily gets out of a range in which the luminous efficiency thereof is high. Therefore, when the length of the increase period of the duty ratio of the switching element operating signal 103 is maintained so as to be the length of a period from the beginning of burst light control until the rare gas fluorescence lamp 1 emits light entirely, approximately in the axial direction, the decline in luminous efficiency can be controlled to the minimum.

Moreover, when the duty of the switching element operating signal 103 is discontinuously changed from the increase period to the steady state operation period, there is a possibility that the voltage waveform of the rare gas fluorescence lamp 1 may be disturbed, so that electric discharge may become unstable. Therefore, when shifting to the steady state operation period from the increase period of the duty ratio of the switching element operating signal 103, by providing the delay circuit 8 as shown in FIG. 7, the duty ratio is changed gently and continuously during the transition period so that the voltage can be supplied consistently, and the voltage waveform of the rare gas fluorescence lamp 1 cannot be disturbed, thereby preventing instability of electric discharge.

Figure 9:
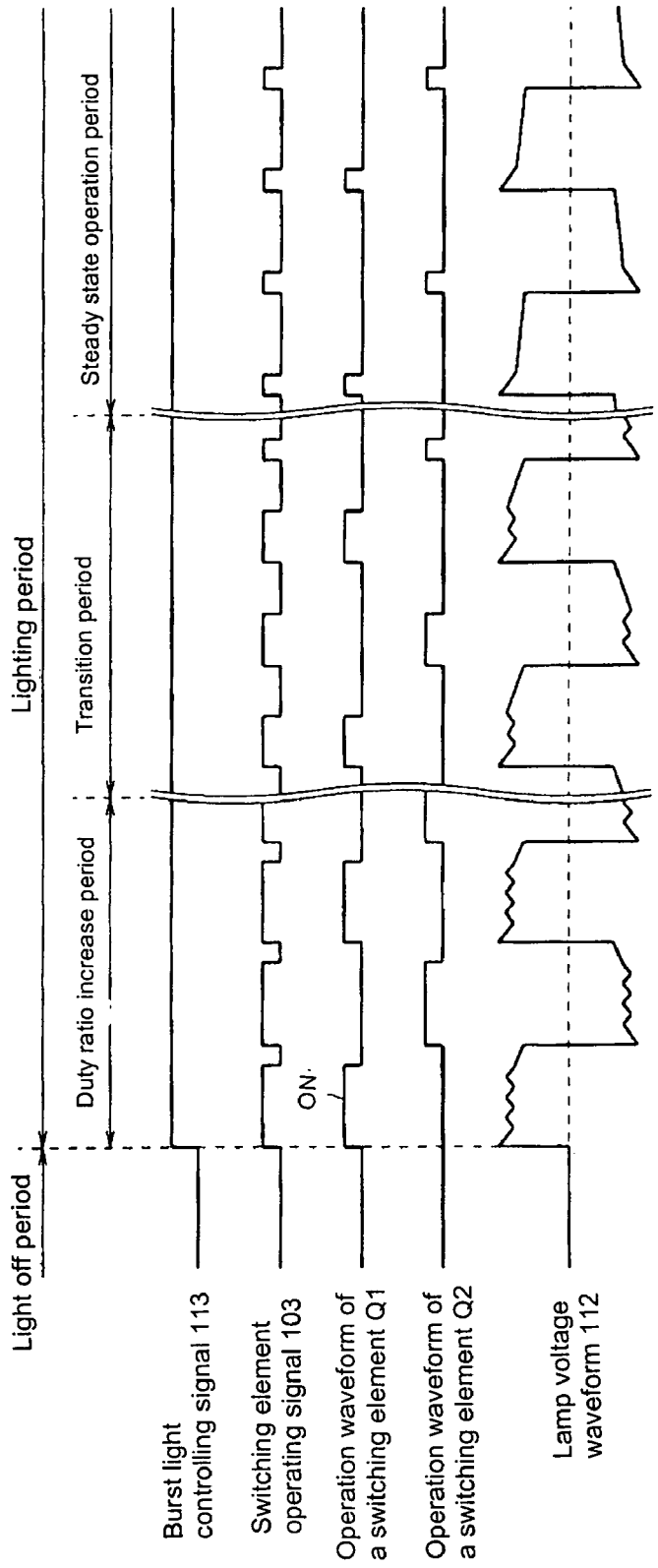
FIG. 9 shows a burst light controlling signal, a switching element operating signal, an operation waveform of a switching element, and a lamp voltage waveform according to a second embodiment.

FIG. 9 shows a waveform of the burst light controlling signal 113, the switching element operating signal 103, operation waveforms showing ON/OFF states of switching elements Q1 and Q2, and the lamp voltage waveform 112 in a period from the beginning of a lighting period of burst light control to a steady state operation period through a duty ratio increasing period and a transition period. The switching elements Q1 and Q2 are alternatively turned on according to an operation of the switching element driving circuit 2 into which the switching element operating signal 103 is inputted. That is, the switching elements Q1 and Q2 are alternatively turned on according to the switching element operating signal 103. The polarity of the lamp voltage waveform 112 is changed so that a steep voltage change occurs, every time the switching element Q1 or Q2 is turned on. The period from the beginning of lighting period of the burst light controlling signal 113 until the rare gas fluorescence lamp 1 emits light entirely, approximately in the axial direction is the period during which the duty ratio is increased. Thus, the duty ratio of the switching element operating signal 103 is increased, and the length of ON periods of the switching elements Q1 and Q2 becomes long, so that attenuation of the flat portion of the lamp voltage waveform 112 can be controlled. Then, it enters into the transition period, in which the duty ratio of the switching element operating signal 103 is changed continuously (or gradually) and gently or moderately. Although the duty ratio of the switching element operating signal 103 returns to a steady state duty ratio in a steady state operation period, since electric discharge has spread entirely, attenuation of the flat portion of the lamp voltage waveform 112 is small.

As mentioned above, in the rare gas fluorescence lamp lighting apparatus according to the present embodiment, during the period from the beginning of the lighting period of burst light control until the rare gas fluorescence lamp 1 emits light entirely, and approximately in the axial direction, the duty ratio of the switching element operating signal 103 is increased, and the duty ratio thereof is gradually and gently changed from a high duty ratio to the steady state through the transition period during which the duty ratio of the switching element operating signal 103 is returned to that in a steady state. In such a manner, since the lamp voltage waveform 112 capable of supplying sufficient energy to the rare gas fluorescent lamp 1 can be formed even immediately after the beginning of lighting, a spread of electric discharge can be accelerated, so that the delay of light emission at a portion distant from the initiation assisting portion 15 can be controlled (suppressed), whereby the uniformity of the luminance distribution of the rare gas fluorescence lamp 1 in the axial direction thereof can be maintained. Furthermore, since the delay of light emission is suppressed, the variation in delay time may become small, so that the flickering produced at the portion distant from the initiation assisting portion 15 can be suppressed. Moreover, since a state where the duty ratio of the switching element operating signal 103 is high, shifts continuously (or gradually) and gently to a state where the duty ratio thereof is low, the voltage waveform of the rare gas fluorescence lamp 1 cannot be disturbed, whereby electric discharge does not become unstable.

Figure 10:
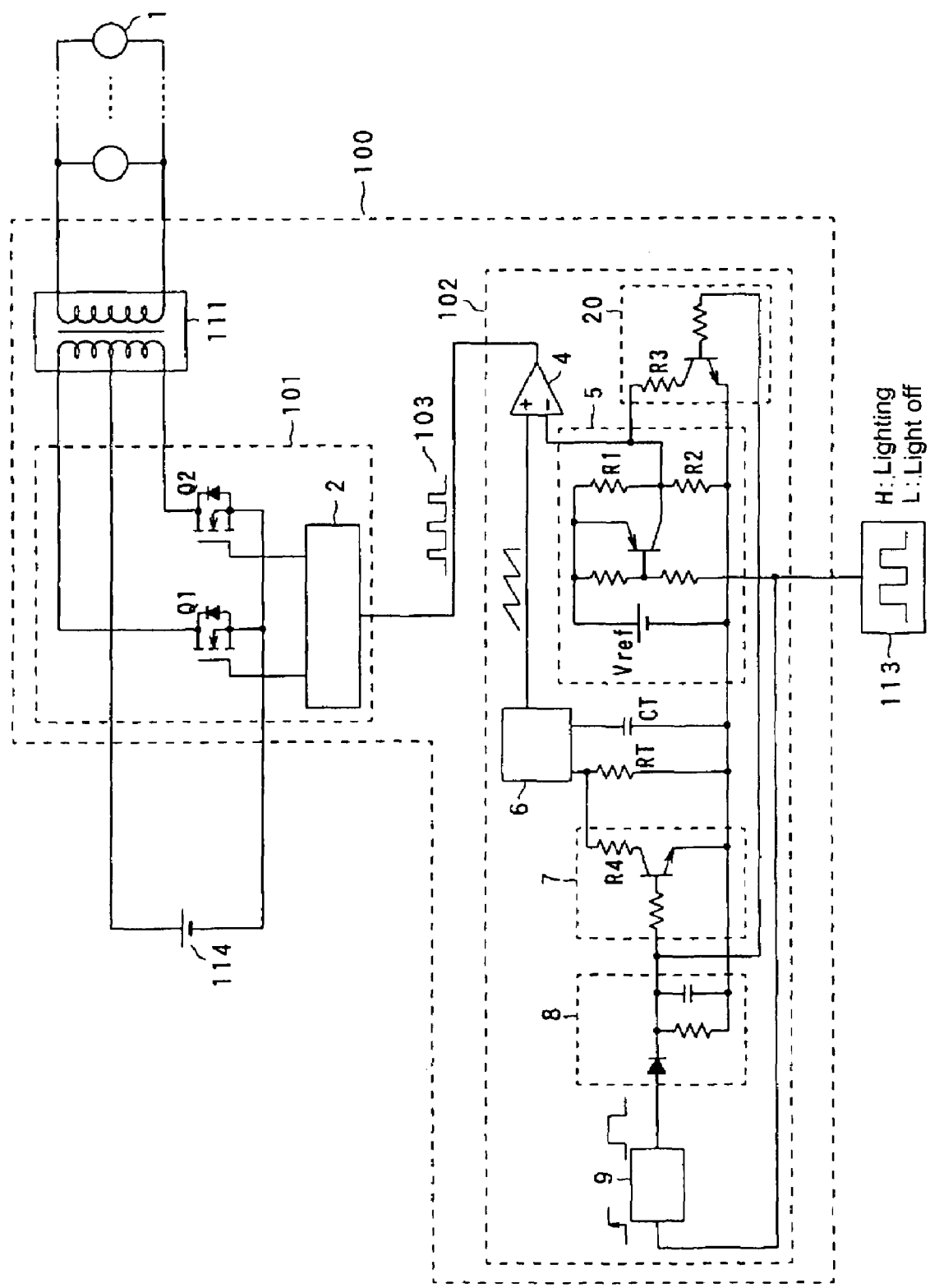
FIG. 10 shows the structure of a rare gas fluorescence lamp lighting apparatus which performs burst light control according to a third embodiment.
Figure 11:
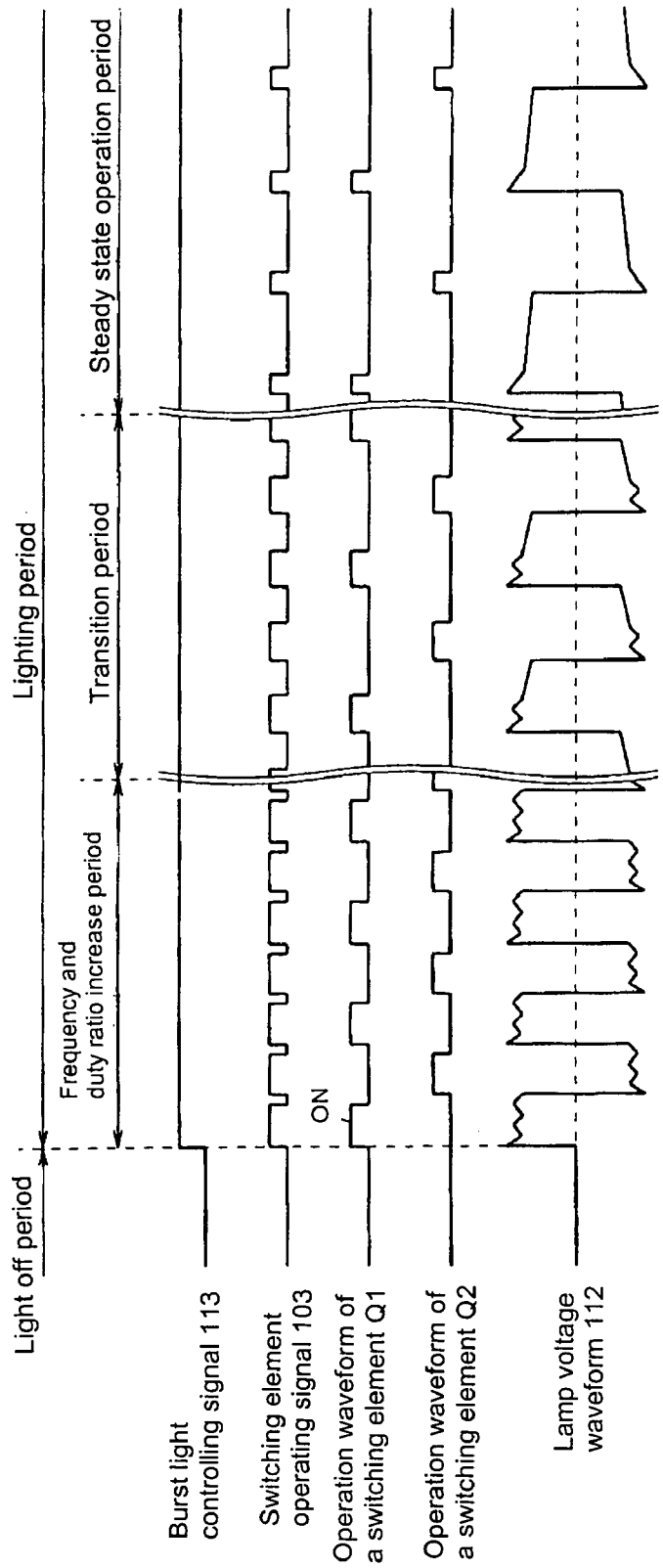
FIG. 11 shows a burst light controlling signal, a switching element operating signal, an operation waveform of a switching element, and a lamp voltage waveform.

Next, a third present embodiment will be described, referring to FIGS. 10 and 11. FIG. 10 shows the structure of a gas fluorescence lamp lighting apparatus which performs burst light control according to the present embodiment. FIG. 11 shows the waveform of a burst light controlling signal 113, a switching element operating signal 103, and operation waveforms of switching elements Q1 and Q2, and a lamp voltage waveform 112. Since the structure of the rare gas fluorescence lamp 1 is the same as that of the first embodiment, explanation thereof is omitted.

As shown in an FIG. 10, in the rare gas fluorescence lamp lighting apparatus, a direct current voltage supplied from a direct-current power source 114 is converted into a high voltage of an alternating current in an inverter circuit 100, and is supplied to the rare gas fluorescence lamp 1 as lighting electric power. Moreover, the inverter circuit 100 carries out an intermittent operation according to the burst light controlling signal 113, and performs burst light control. The inverter circuit 100 comprises a boosting transformer 111, a switching element circuit 101, and an inverter control circuit 102. The switching element circuit 101 comprises a switching element Q1, a switching element Q2, and a switching element driving circuit 2. The inverter control circuit 102 comprises a comparator 4, a reference voltage controlling circuit 5, an oscillating circuit 6, a frequency increasing circuit 7, a delay circuit 8, a timer circuit 9, and a switching element duty ratio increasing circuit 20.

First, description of the inverter control circuit 102 will be given below. The oscillating circuit 6 in the inverter control circuit 102 outputs an oscillation signal in form of a periodic saw waveform, and the voltage of a saw waveform is inputted into the plus terminal of the comparator 4. A comparison voltage from the reference voltage controlling circuit 5 is inputted into the minus terminal of the comparator 4. Only when the drive signal of the voltage in form of the saw waveform exceeds the comparison voltage, the output voltage of the comparator 4 becomes high. That is, the switching element operating signal 103 which is the output voltage of the comparator 4 becomes a pulse waveform in which a duty ratio is changed according to the magnitude of the comparison voltage, and when the comparison voltage is smaller, the duty ratio becomes higher, and when the comparison voltage is higher, the duty ratio becomes smaller.

When the burst light controlling signal 113 is high, a transistor in the reference voltage controlling circuit 5 is in an off state, and the comparison voltage inputted into the minus terminal of the comparator 4 becomes Vref×R2/(R1+R2). This comparison voltage Vref×R2/(R1+R2) is smaller than the peak voltage of the saw waveform which is the oscillation signal of the oscillating circuit 6. Therefore, the comparator 4 outputs the switching element operating signal 103 in form of a pulse waveform with the duty ratio corresponding to the magnitude of this comparison voltage, so that the rare gas fluorescence lamp 1 is turned on. [0110] When the burst light controlling signal 113 is low, a transistor in the reference voltage controlling circuit 5 is turned on, so that the comparison voltage becomes almost the same as Vref. Since the magnitude of Vref is set up so as to be larger than the peak voltage of the saw waveform which is the oscillation signal of the oscillating circuit 6, the switching element operating signal 103 which is the pulse waveform output of the comparator 4 becomes low, so that the rare gas fluorescence lamp 1 is turned off.

Furthermore, the inverter control circuit 102 comprises the timer circuit 9 which controls the length of the frequency increase period of the switching element operating signal 103, the delay circuit 8 which continuously changes the frequency and the duty ratio of the switching element operating signal 103 from the end of the frequency increase period to a steady state operation period through a transition period, and the frequency increasing circuit 7 which temporarily decreases the timing resistance of the oscillating circuit 6 so as to increase the frequency, a switching element duty ratio increasing circuit 20 which temporarily decreases the comparison voltage inputted into the comparator 4, so as to increase the duty ratio of the switching element operating signal 103. The frequency of the oscillating circuit 6 is determined by the value of the timing resistance RT and the timing capacitance CT, and the timing resistance RT and the oscillation frequency have the relation of an inverse proportion. The burst light controlling signal 113 is inputted into the reference voltage controlling circuit 5 and the timer circuit 9.

When the burst light controlling signal 113 becomes high, a transistor in the reference voltage controlling circuit 5 is turned off, and at the same time, the output of the timer circuit 9 becomes high. And the capacitor of the delay circuit 8 is charged immediately and the transistor of the frequency increasing circuit 7 and the transistor of the switching element duty ratio increasing circuit 20 are turned on. Consequently, the timing resistance of the oscillating circuit 6 becomes the size of the parallel resistance of R4 and RT, so that the operating frequency of the switching element operating signal 103 which is in an inverse proportion to the timing resistance, is increased. Moreover, the comparison voltage inputted into the minus terminal of the comparator 4 falls, and the duty ratio of the switching element operating signal 103 is increased.

Next, when setup time of the timer circuit 9 elapses, the output of the timer circuit 9 becomes low. The length of the setup time of the timer circuit 9 is set to the length of a time period required for completion of the entire light emission, that is, a period from the beginning of lighting according to the burst light control to completion of the entire light emission of the rare gas fluorescence lamp 1, approximately in the axial direction. The time period is obtained by experiments beforehand.

When the output of the timer circuit 9 becomes low, the capacitor voltage of the delay circuit 8 falls gradually according to the time constant of the capacitor and the resistor, and the resistance between the collector and emitter of the transistors of the frequency increasing circuit 7 and the resistance between the collector and emitter of the transistors of the switching element duty ratio increasing circuit 20 becomes larger gradually, so that the frequency and the duty ratio thereof decrease gently and continuously. When each transistor is completely turned off, since the timing resistance becomes RT, the comparison voltage becomes Vref×R2/(R1+R2) so that the operating frequency and the duty ratio of the switching element operating signal 103 return to those in steady state. Thus, the transition period from a state in which the duty ration of the switching element operating signal 103 increases to a state where the duty ratio thereof decreases gradually so as to return to a steady state, is suitably set up by the time constant of a capacitor and a resistor which forms the delay circuit 8.

Since the switching element circuit 101 and the boosting transformer 111 are the same as those of the first present embodiment, description thereof is omitted.

Moreover, when the frequency and the duty ratio of the switching element operating signal 103 is discontinuously changed from the increase period to the steady state period, there is a possibility that the voltage waveform 112 of the rare gas fluorescence lamp 1 may be disturbed, and electric discharge may become unstable. Therefore, when shifting to the steady state operation period from the increase period of the frequency and the duty ratio of the switching element operating signal 103, by providing the delay circuit 8 as shown in FIG. 10, the frequency and the duty ratio thereof are changed gently and continuously during the transition period, so that the voltage can be supplied stably, and the voltage waveform of the rare gas fluorescence lamp 1 cannot be disturbed, thereby preventing instability of electric discharge In the present embodiment, during the period from the beginning of the lighting period of burst light control until the rare gas fluorescence lamp 1 emits light entirely, approximately in the axial direction, both the frequency and duty ratio of the switching element operating signal 103 are increased, so that the effects of the first and the second embodiments can be shared, and appreciable effects can be acquired therefrom. That is, during the period from the beginning of the lighting period of burst light control until the rare gas fluorescence lamp 1 emits light entirely, approximately in the axial direction, the frequency of the switching element operating signal 103 is increased, so that the number of times of the electric discharge cycle per unit is increased, so that a spread of electric discharge can be accelerated. Furthermore, during the period from the beginning of the lighting period of burst light control until the rare gas fluorescence lamp 1 emits light entirely, approximately in the axial direction, the duty ratio of the switching element operating signal 103 is increased, so that the lamp voltage waveform 112 capable of supplying sufficient energy to the rare gas fluorescence lamp 1 can be formed, so that a spread of electric discharge can be accelerated.

In such a manner, the delay of light emission in a portion distant from the initiation assisting portion 15 can be suppressed, and the uniformity of luminance distribution in the axial direction of the rare gas fluorescence lamp 1 can be maintained. Furthermore, by suppressing the delay of the light emission, the change of the brightness due to the variation in delay time becomes small, and flickering produced at the portion distant from the initiation assisting portion 15 can be suppressed.

FIG. 11 shows the waveform of a burst light controlling signal, a switching element operating signal 103, and operation waveforms of the switching elements Q1 and Q2, and a lamp voltage waveform 112 in a period from the beginning of the lighting period of burst light control to the steady state operation period through a frequency increasing period and a transition period. The switching elements Q1 and Q2 are alternatively turned on according to an operation of the switching element operating signal 103. The polarity of the lamp voltage waveform 112 is changed so that a steep voltage change occurs, every time the switching element Q1 or Q2 is turned on. The period from the beginning of lighting period of the burst light controlling signal 113 until the rare gas fluorescence lamp 1 emits light entirely, approximately in the axial direction is not only a frequency increase period but also a duty ratio increase period, so that the frequency and the duty ratio of the switching element operating signal 103 are increased, whereby the frequency at which steep voltage changes of the lamp voltage waveform 112 occurs, is increased, and attenuation of the flat portion of the lamp voltage waveform 112 can be controlled. Then, it enters into the transition period, and the frequency and the duty ratio of the switching element operating signal 103 are continuously (or gradually) and gently changed. In a steady state operation period, the frequency of the switching element operating signal 103 and the duty ratio thereof return to those in a steady state, so that the lamp voltage waveform 112 also shows the voltage change at the time of a steady state operation.

As mentioned above, in the rare gas fluorescence lamp lighting apparatus according to the present embodiment, during the period from the beginning of the lighting period of burst light control until the rare gas fluorescence lamp 1 emits light entirely, approximately in the axial direction, the frequency and the duty ratio of the switching element operating signal 103 are increased. Thus, the high frequency and high duty ratio state is changed to a the steady state, through the transition period during which the frequency and the duty ratio of the switching element operating signal 103 are continuously and gradually changed (reduced). In such a manner, the number of times of steep voltage changes per unit time is increased, and furthermore, since the lamp voltage waveform 112 capable of supplying sufficient energy to the rare gas fluorescence lamp 1 can be formed even immediately after the beginning of lighting, a spread of electric discharge can be accelerated, so that the delay of light emission at the portion distant from the initiation assisting portion 15 can be suppressed and uniformity of luminance distribution in the axial direction of the rare gas fluorescent lamp 1 can be maintained. Furthermore, since the delay of the light emission is suppressed so that the variation in delay time may become small, the flickering produced at the portion distant from the initiation assisting portion 15 can be suppressed. Moreover, since the frequency and the duty ratio of the switching element operating signal 103 are changed continuously (or gradually) and gently from high to low, the voltage waveform of the rare gas fluorescence lamp 1 cannot be disturbed, thereby preventing instability of electric discharge.

Figure 12:
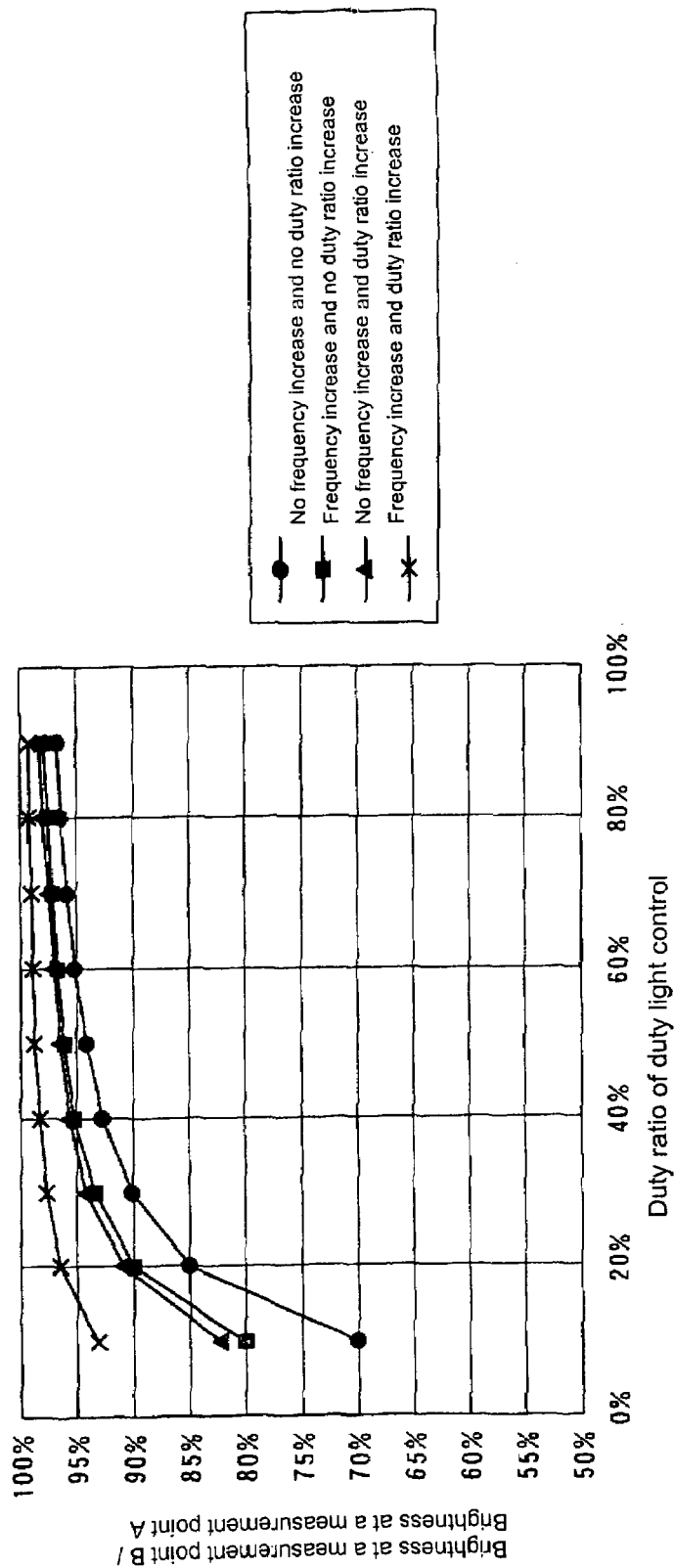
FIG. 12 shows an experimental result of a rare gas fluorescence lamp lighting apparatus according to a first or third embodiment.
Figures 13, 14:
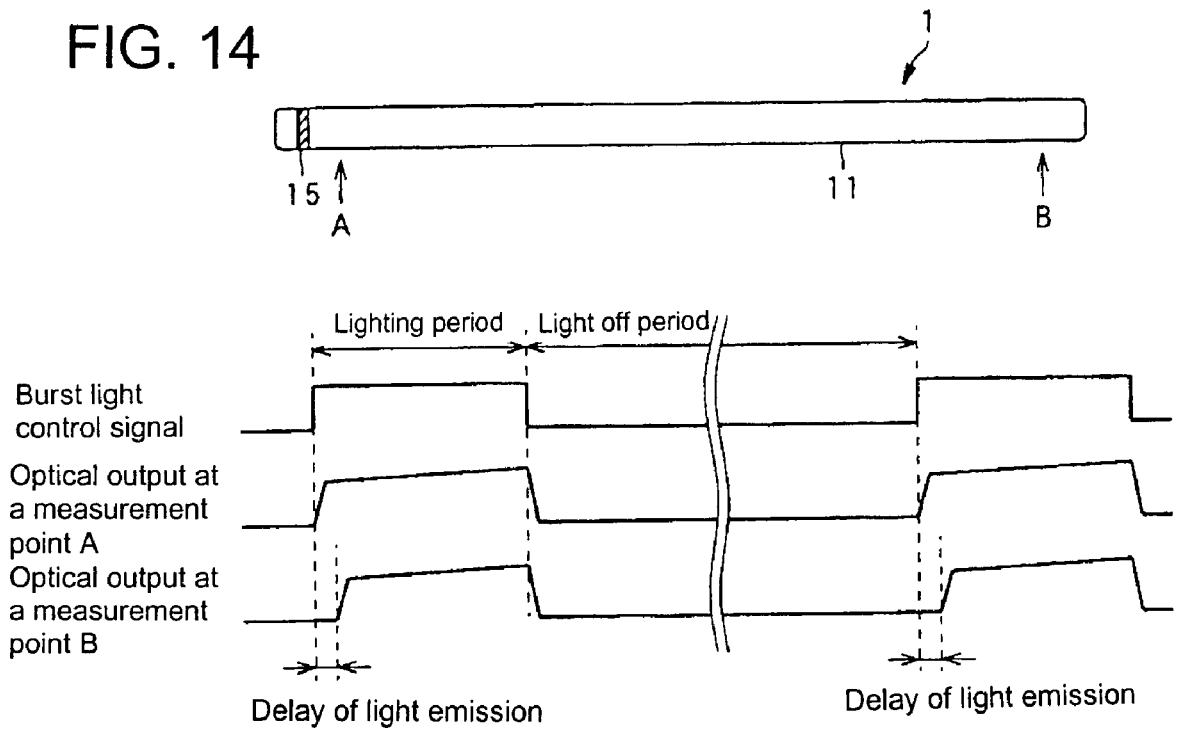
FIG. 13 shows an experimental result of a rare gas fluorescence lamp lighting apparatus according to a third embodiment.
FIG. 14 shows the structure of the conventional rare gas fluorescence lamp which performs burst light control and a burst light controlling signal, an optical output at a measurement point A, and an optical output at a measurement point B according to the conventional technology.

Next, FIGS. 12 and 13 show an experimental result of the rare gas fluorescence lamp lighting apparatus according to the first to third present embodiments.

In the rare gas fluorescence lamp lighting apparatus, four rare gas fluorescence lamps were arranged in parallel to each other so as to be turned on. Each of the rare gas fluorescence lamps was 8.0 mm in a tube diameter, 500 mm in full length, and contained filler gas Xe 160 Torr, in which by applying a conductive substance to the interior of the rare gas fluorescence lamp, the initiation assisting portion 15 was provided at the one side of the end portion of the rare gas fluorescence lamp. The frequency of the switching element operating signal was set to 100 kHz, and the duty ratio of the switching element operating signal was set to 20%. The frequency in burst light control was set to 100 Hz. In case where the brightness was measured near an end portion in a side where the initiation assisting portion 15 was provided (hereinafter referred to as a measurement point A), and the brightness was measured near an end portion in an opposite side where the initiation assisting portion 15 was provided (hereinafter referred to as a measurement point B), while changing the duty ratio of burst light control (a lighting period of burst light control/a cycle of a burst light control), FIG. 12 shows the relation between a value which was obtained by dividing the brightness at the measurement points B by the brightness at the measurement point A (the brightness at the measurement point B/the brightness at the measurement point A) and the duty ratio of burst light control, Moreover, FIG. 13 shows the existence or nonexistence of flickering, and delay time from light emission at the measurement point A to light emission at the measurement point B, in case the duty ratio in burst light control was changed.

When the duty ratio in burst light control was 10%, the brightness at the measurement point B drops down to 70% of the brightness at the measurement point A. Moreover, as shown in FIG. 13, when the duty ratio in burst light control was about 40%, flickering occurs near the measurement point B. Moreover, the delay time from the light emission at the measurement point A to the light emission at the measurement point B was 200-400 µs (microseconds).

Next, the increase period of the frequency of the switching element operating signal 103 was provided in an early stage of the lighting period of burst light control, and lighting was carried out. The frequency of the switching element operating signal 103 during the increase period was set to 200 kHz, and the length of the increase period was set to 100 µs (microseconds), and the length of the transition period thereof was set to 100 µs (microseconds). When the brightness at the measurement point A, and the brightness at the measurement point B, were measured, while changing the duty ratio of burst light control, as shown in FIG. 12, in case the duty ratio in burst light control was 10%, the brightness at the measurement point B was maintained to 80% of the brightness at the measurement point A. Moreover, as a result of checking the existence or nonexistence of flickering, as shown in FIG. 13, in case the duty ratio in burst light control was 30% or more, flickering did not occur. Moreover, the delay time from the light emission at the measurement point A to the light emission at the measurement point B was 130 to −270 µs (microseconds).

Then, the increase period of the duty ratio of the switching element operating signal 103 was provided in an early stage of the lighting period of burst light control, and the lighting was carried out. The duty ratio of the switching element operating signal 103 of the increase period was set to 80%, the length of the increase period was set to 100 µs (microseconds), and the length of the transition period was set to 100 µs (microseconds). When the brightness at the measurement point A, and the brightness at the measurement point B were measured while changing the duty ratio of burst light control, as shown in FIG. 12, in case the duty ratio in burst light control was 10%, the brightness at the measurement point B was maintained to 82% of the brightness at the measurement point A. Moreover, as a result of checking the existence and nonexistence of flickering, as shown in FIG. 13, in case that the duty ratio of burst light control was 30% or more, flickering did not occur. Moreover, delay time from the light emission at the measurement point A to the light emission at the measurement point B was 120-240 µs (microseconds).

Then, the increase period of the frequency and the duty ratio of the switching element operating signal 103 were provided in an early stage of the lighting period according to burst light control, and the lighting was carried out. The frequency of the switching element operating signal 103 in an increase period was set to 200 kHz, the duty ratio was set to 80%, the length of the increase period was set to 100 μs (microseconds), and the length of the transition period was set to 100 μs (microseconds). When the brightness at the measurement point A, and the brightness at the measurement point B, were measured, while changing the duty ratio of burst light control, as shown in an FIG. 12, in case the duty ratio of burst light control was 10%, the brightness at the measurement point B was maintained to 93% of the brightness at the measurement point A.

Moreover, as a result of checking the existence or nonexistence of flickering, as shown in an FIG. 13, even when the duty ratio of burst light control was 10%, flickering did not occur. Moreover, the delay time from the light emission at the measurement point A to the light emission at the measurement point B was 50-90 μs (microseconds).

Next, a fourth embodiment is explained, referring FIG. 15 to FIG. 23. In the rare gas fluorescence lamp lighting device according to the first to third embodiments, although flickering is prevented, it turns out that there is a possibility that high surge voltage is generated, and creeping discharge between the electrodes in the outside of electrical discharge space, or dielectric breakdown of, for example, a connector, wiring etc. occurs due to a high lamp impedance at the beginning of the lighting period in burst light control.

According to the fourth embodiment, in "the period of burst light control from the beginning of light emission until light is emitted entirely in the axial direction of the lamp," without increasing the frequency of the switching element operating signal suddenly, or increasing the duty ratio of a switching element operating signal suddenly, but gradually increasing (or in a stepwise fashion) the frequency and the duty ratio, it is possible to suppress an over voltage input, and control the non uniformity of luminance distribution, or flickering, and further, it is possible to provide a rare gas fluorescence lamp lighting apparatus having an excellent safety aspect.

Figure 15:
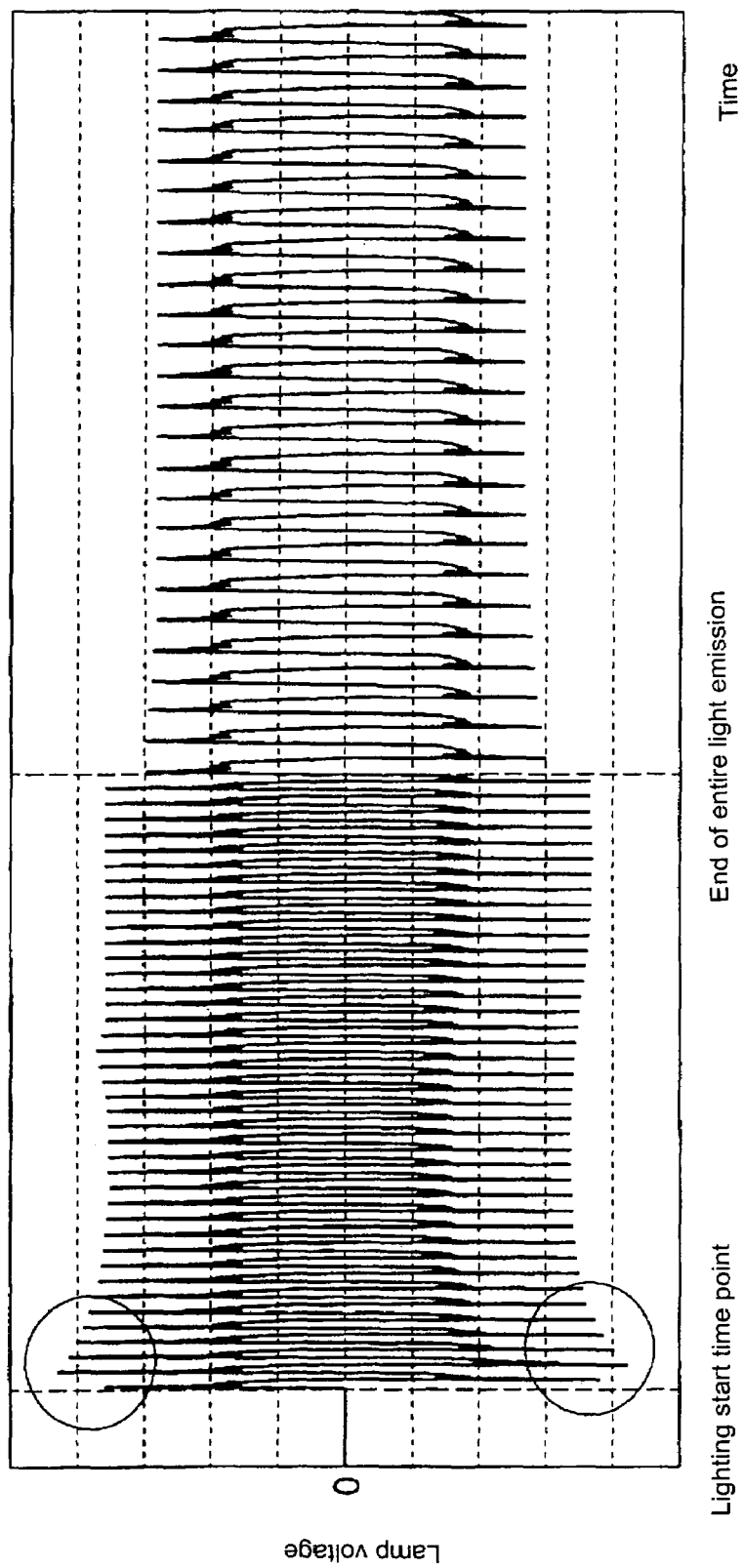
FIG. 15 shows a detailed lamp voltage waveform in a period from a frequency increase period to a steady state operation period shown in FIG. 6.

FIG. 15 shows a detailed lamp voltage waveform during a period from the frequency increase period to a steady state operation period shown in FIG. 6. In addition, the transition period shown in FIG. 6 is not shown in the figure. In this figure, a period from a lighting start point to the end of the entire light emission is the frequency increase period, and a period after the end of the entire light emission is a steady state operation period. Compared with the steady state operation period, in the lamp voltage generated in the frequency increase period, high surge voltage is generated entirely. Specifically, the surge voltage is remarkably high immediately after lighting is started, compared with the other periods (refer to a circled portion in FIG. 15). Thus, the reason that the surge voltage becomes high immediately after the lighting is started, is that the electric power supply capacity from a lighting circuit to the lamp increases due to the frequency increase immediately after the lighting is started. On the other hand, since electric discharge of the rare gas fluorescence lamp is not formed yet, it is considered that the impedance of the lamp is equivalent to the capacitance of a capacitor with small electrostatic capacity, and the high Q (Quality factor) resonance circuit of is formed between it and the leakage inductances of the transformer. This high surge voltage may cause deterioration of insulating materials of, for example, the transformer, a connector, and wiring, and shorten the life span of the apparatus. In addition, the light emission starting timing and the end of entire light emission can be detected by taking an image of spread of light emission by a high speed video camera, or measuring time change of outputs which are simultaneously obtained from two or more optical sensors provided in the lamp axial direction.

Figure 16:
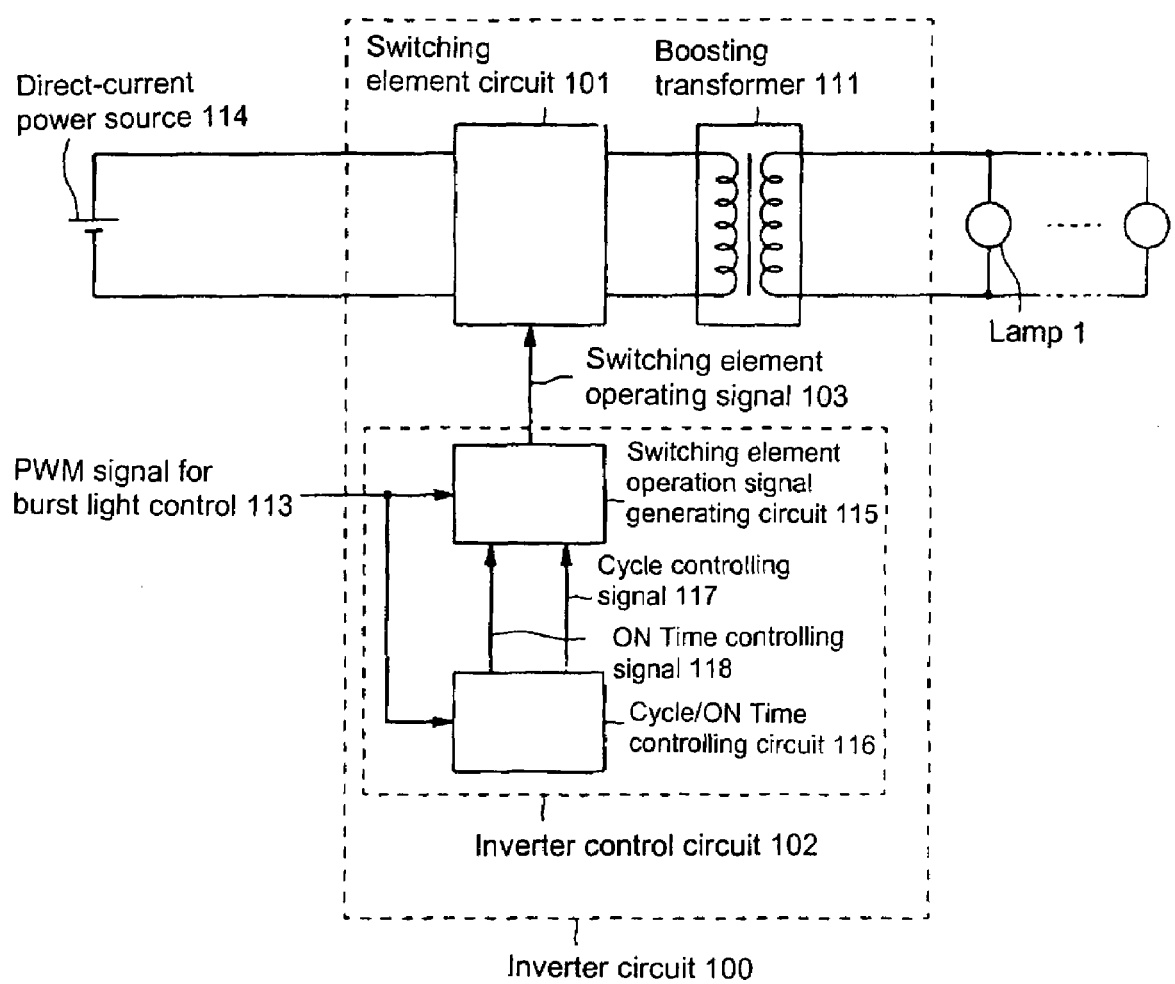
FIG. 16 shows the structure of a rare gas fluorescence lamp lighting apparatus which performs burst light control according to a fourth embodiment.

FIG. 16 shows the structure of the rare gas fluorescence lamp lighting apparatus which performs burst light control according to the embodiment. In this figure, an inverter circuit 100 converts a direct current voltage from a direct-current power source 114 into a high-frequency high-voltage, and impresses it to a rare gas fluorescence lamp 1. The inverter circuit 100 has a function of performing burst light control based on the burst light controlling signal inputted from the outside (for example, light control controlling circuit of a liquid crystal television etc.). The inverter circuit 100 comprises a switching element circuit 101, a boosting transformer 111, and an inverter control circuit 102. Moreover, the switching element circuit 101 comprises a push pull circuit system, a half bridge circuit system, or a full bridge circuit system, etc., in which, the direct current voltage, supplied from the direct-current power source 114 is, converted to a high-frequency voltage so as to be outputted. The boosting transformer 111 boosts the high-frequency voltage supplied from the switching element circuit 101, and outputs it after converting it into a high-frequency a high-voltage. The high-frequency high-voltage outputted from the boosting transformer 111 is inputted into the rare gas fluorescence lamp 1. While the inverter control circuit 102 outputs a switching element operating signal 103 for controlling the switching elements Q1 and Q2 of the switching element circuit 101, the inverter control circuit 102 has a function of performing burst light control, according to a burst light controlling signal 113 from the outside. The inverter control circuit 102 comprises a switching element operation signal generating circuit 115 and a cycle/ON Time controlling circuit 116.

The burst light controlling signal is inputted into the cycle/ON time controlling circuit 116 which outputs an ON Time controlling signal 118 and a cycle controlling signal 117 to the switching element operation signal generating circuit 115. The ON Time controlling signal 118 represents the length of the ON time of a switching element operating signal 103, and the cycle controlling signal 117 represents the length of the cycle of the switching element operating signal 103. The length of the ON Time controlling signal 118 and the cycle controlling signal 117 are stored in the circuit, so that the lengths can be changed for every setup time on the basis of the burst light controlling signal. The burst light controlling signal 113, the ON Time controlling signal 118, and the cycle controlling signal 117 are inputted into the switching element operation signal generating circuit 115, which outputs the switching element operating signal 103. The length of a cycle of the switching element operating signal 103 is the length of the cycle controlling signal 117, and the ON time thereof is a pulse signal having the length of the ON Time controlling signal 118. Moreover, the output and no output of the switching element operating signal 103 are controlled, according to the burst light controlling signal 113.

Figure 17A:
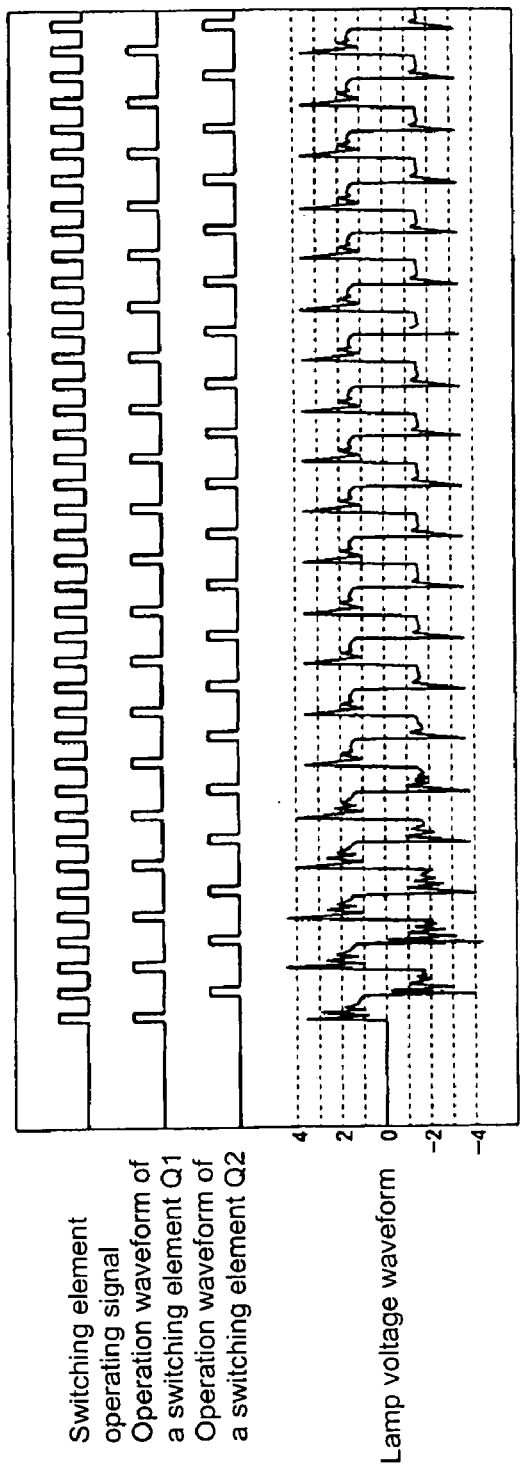
FIG. 17A shows an operation signal of a switching element, an operation waveforms of ON/OFF states of a switching element, and a lamp voltage waveform, in a rare gas fluorescence lamp lighting apparatus having an inverter circuit, as shown in the FIG. 16, in case of increasing the frequency of a switching element operating signal from the beginning of lighting according to burst light control.
Figure 17B:
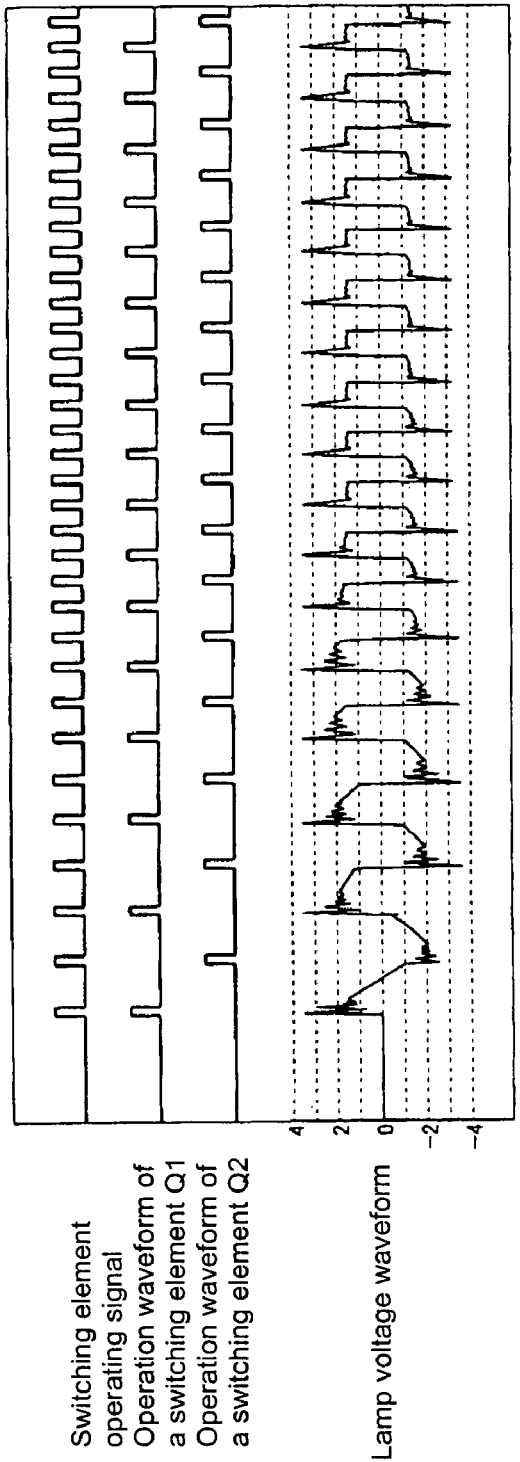
FIG. 17B shows waveforms thereof, in case of increasing gradually the frequency of a switching element operating signal from the beginning of lighting according to burst light control.

FIGS. 17A and 17B show the switching element operating signal 103, waveforms showing ON/OFF states of the switching elements Q1 and Q2, and a lamp voltage waveform in an early stage of lighting period of the burst light control in the rare gas fluorescence lamp lighting apparatus shown in the FIG. 16.

FIG. 17A shows waveforms in case of increasing the frequency of the switching element operating signal 103 from the beginning of lighting according to burst light control, and FIG. 17 B shows waveforms in case of increasing gradually the frequency of the switching element operating signal 103 from the beginning of lighting according to burst light control. In the case of FIG. 17 A, in the voltage waveform immediately after lighting is started, high surge voltage which exceeds a predetermined voltage is generated.

On the other hand, in the case of FIG. 17 B, it turns out that in the voltage waveform obtained immediately after lighting is started, high surge voltage which exceeds a predetermined voltage is not generated so that the surge voltage is suppressed. In addition, the above-mentioned predetermined voltage is 2 kV.

FIGS. 18 A and 18 B show the switching element operating signal 103, waveforms of ON/OFF states of the switching elements Q1 and Q2, and a lamp voltage waveform in an early stage of a lighting period of burst light control in the rare gas fluorescence lamp lighting apparatus shown in FIG. 16.

Figure 18A:
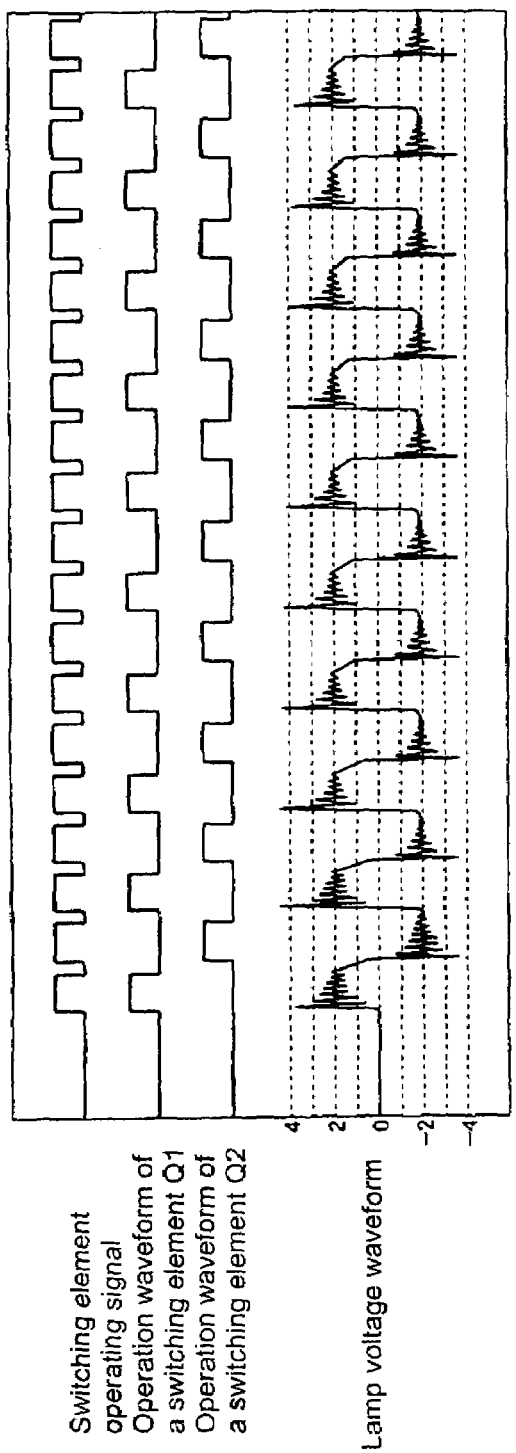
FIGS. 18A and 18B show a switching element operating signal in an early stage of a lighting period of burst light control, and a waveform showing ON/OFF states of switching elements, and a lamp voltage waveform in a rare gas fluorescence lamp lighting apparatus shown in FIG. 16.
Figure 18B:
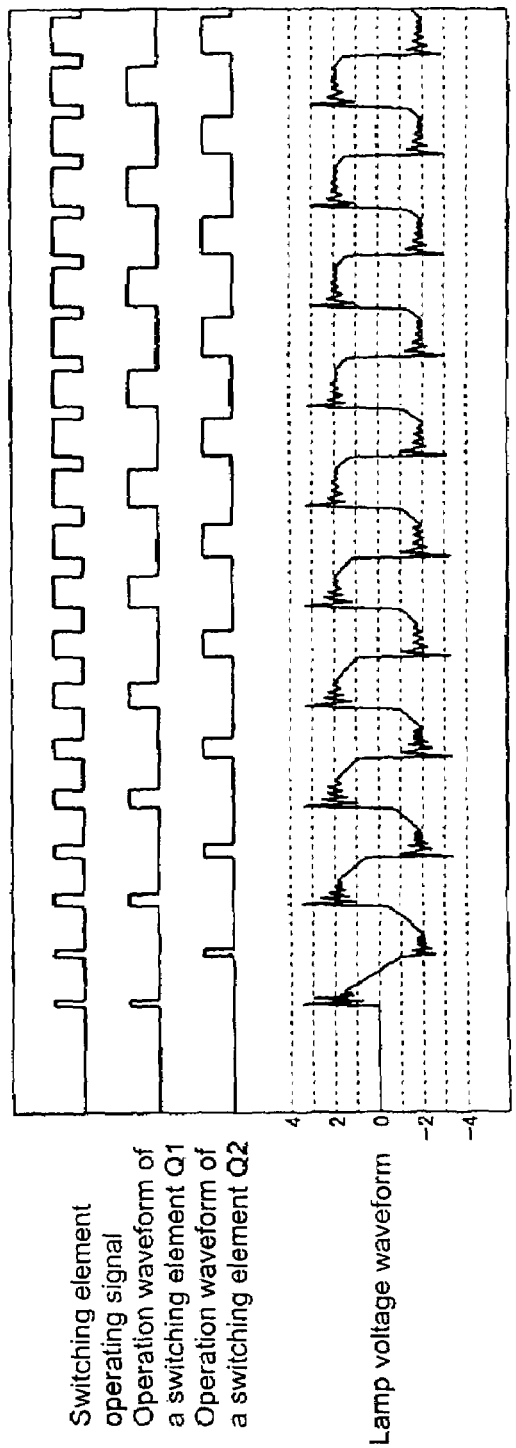

FIG. 18A shows waveforms in case of increasing the duty ratio of the switching element operating signal 103 from the beginning of lighting, according to burst light control, and FIG. 18B shows waveforms in case of increasing gradually the duty ratio of the switching element operating signal 103 from the beginning of lighting according to burst light control. In the case of the FIG. 18 A, in a lamp voltage waveform obtained immediately after lighting is started, high surge voltage which exceeds a predetermined voltage is generated. On the other hand, in the case of FIG. 18 B, in the voltage waveform obtained immediately after lighting is started, high surge voltage which exceeds a predetermined voltage is not generated, so that the surge voltage is suppressed.

FIGS. 19 A and 19B show the switching element operating signal 103, and waveforms of ON/OFF states of the switching elements Q1 and Q2, and a lamp voltage waveform in an early stage a lighting period of burst light control in the rare gas fluorescence lamp lighting apparatus shown in the FIG. 16.

FIG. 19 A shows waveforms in case of increasing the frequency and the duty ratio of the switching element operating signal 103 from the beginning of lighting according to burst light control, and FIG. 19 B shows waveforms in case of increasing gradually the frequency and the duty ratio of the switching element operating signal 103 from the beginning lighting according to burst light control. In the case of FIG. 19 A, in a lamp voltage waveform obtained immediately after lighting is started, high surge voltage which exceeds a predetermined voltage is generated. On the other hand, in the case of FIG. 19 B, high surge voltage which exceeds predetermined voltage is not generated, so that a surge voltage is suppressed.

Figure 20:
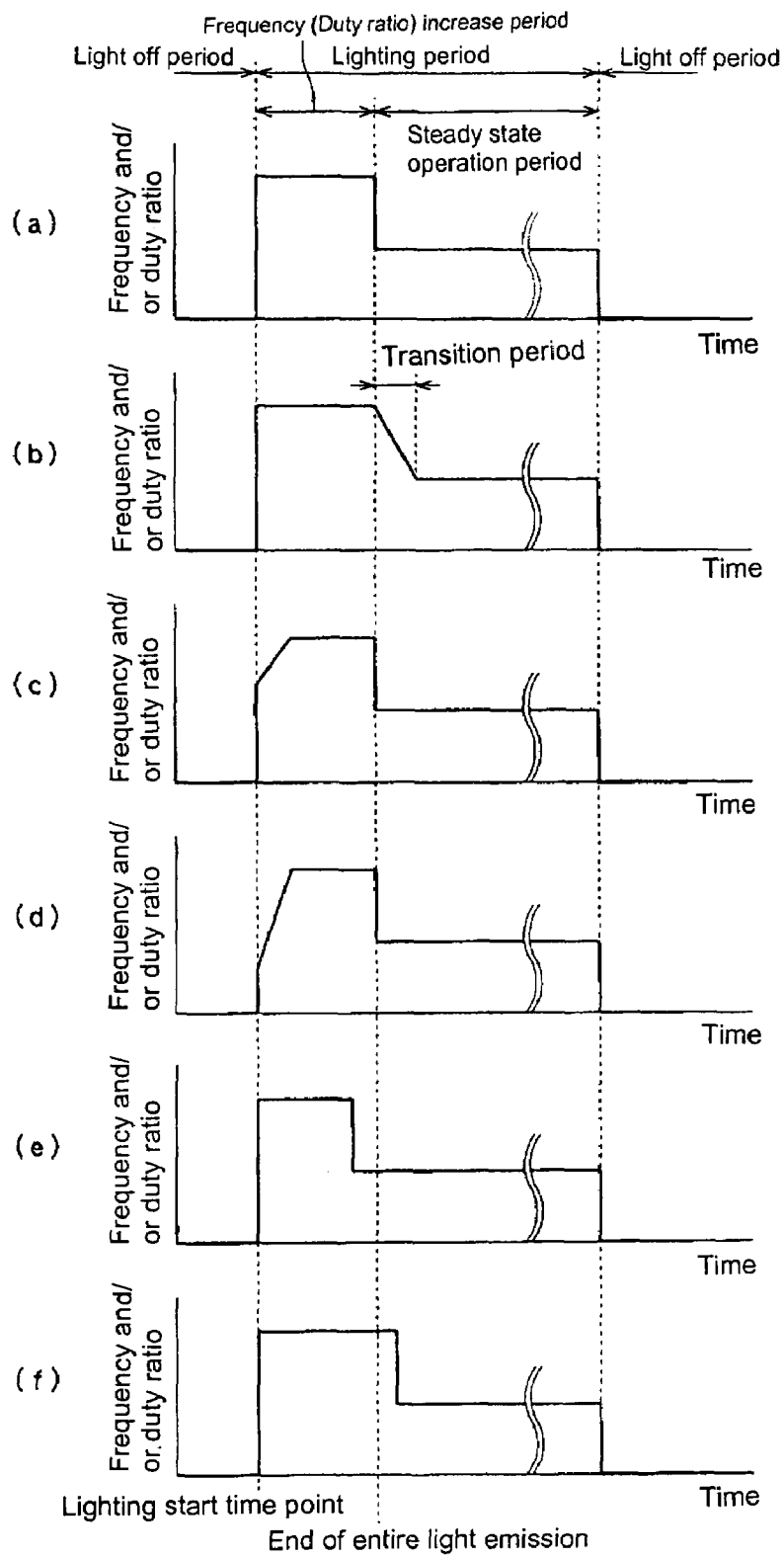
FIG. 20 is a schematic diagram showing time change of the frequency and/or the duty ratio of a switching element operating signal in the entire lighting period of burst light control.

FIG. 20 ((a)-(f)) is a schematic diagram showing time change of the frequency and/or the duty ratio of the switching element operating signal 103 in the entire light emission period of burst light control.

FIG. 20(a) shows the frequency and/or the duty ratio of the switching element operating signal 103 during a period from the beginning of lighting period (lighting start time point) to a time point when the rare gas fluorescence lamp emits lights entirely (the end of the entire light emission), in which the frequency and/or the duty ratio of the switching element operating signal 103 are (is) higher than those (that) in a steady state operation and are (is) constant. In such a manner since, a period from the beginning of lighting to the end of entire light emission is shortened, there are effects that the uniformity of luminance distribution is improved and flickering is suppressed.

The frequency and/or the duty ratio of the switching element operating signal 103 can be changed back to those (that) of a steady state operation, either before the end of the entire light emission completion time point as shown in FIG. 20 (e) or after the end of the entire light emission as shown in FIG. 20 (f). In either case, the same effects can be acquired. However, since the luminous efficiency deteriorates if the frequency and/or the duty ratio are (is) changed back to those (that) in the steady state operation period after the end of entire light emission, it is desirable to change them (it) back to those (that) in the steady state operation period as soon as the entire light emission is carried out.

Figure 21:
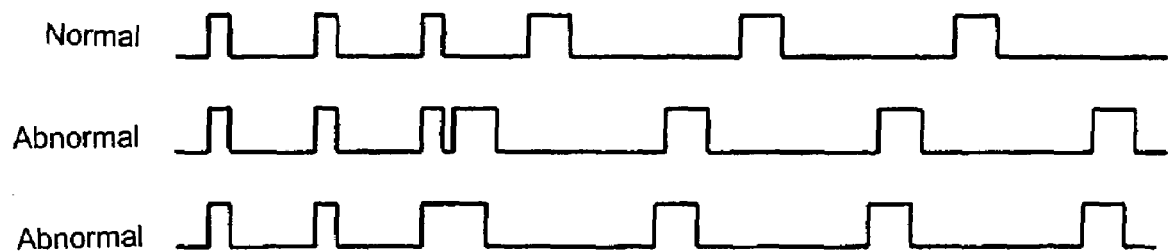
FIG. 21 is a diagram to explain a problem of disorder of a switching element operating signal 103, in case the frequency and/or the duty ratio of the switching element operating signal are (is) changed largely and suddenly.

FIG. 20 (b) shows the frequency and/or the duty ratio of the switching element operating signal 103 during a period from the beginning of lighting to the end of the entire light emission, in which the frequency and/or the duty ratio of the switching element operating signal 103 are (is) higher than those (that) in a steady state operation and are (is) constant, and in which the frequency and/or the duty ratio of the switching element operating signal 103 are (is) continuously changed back (decreased) to those (that) in a steady state operation, and are (is) equivalent to the conditions of operation in the cases shown in FIGS. 6, 9, and 11. When the frequency and/or the duty ratio of the switching element operating signal 103 are (is) rapidly changed, there is a problem that the switching element operating signal 103 is disturbed as shown in FIG. 21. However, the disorder of the switching element operating signal 103 can be prevented by decreasing them continuously, as mentioned above. Although it is possible to avoid such a problem by configuring an inverter control circuit in form of a digital circuit, and performing synchronous control when it is configured in form of an analog circuit, the above-mentioned method is effective.

In FIGS. 20 (c) and (d), the frequency and/or the duty ratio of the switching element operating signal 103 are (is) higher than those (that) in the steady state operation period during a period from the beginning of lighting to the end of an entire light emission, and also the frequency and/or the duty ratio of the switching element operating signal 103 are (is) gradually increased during a certain fixed period before the end of entire light emission, that is, an early stage of the fixed period. It is possible to suppress remarkably high surge voltage generated immediately after the lighting is started, as shown in FIG. 15, by gradually increasing the frequency and/or the duty ratio of the switching element operating signal 103 (during a period from the beginning of the lighting) to the beginning of the certain period.

In FIG. 20 (c), at a lighting start time point (the beginning of lighting), the frequency and/or the duty ratio of the switching element operating signal 103 are (is) higher than those (that) in the steady state operation period. In (d) of FIG. 20, the frequency and/or the duty ratio of the switching element operating signal 103 are (is) lower than those (that) in the steady state operation period. In either case, the same effect can be acquired.

Figure 22:
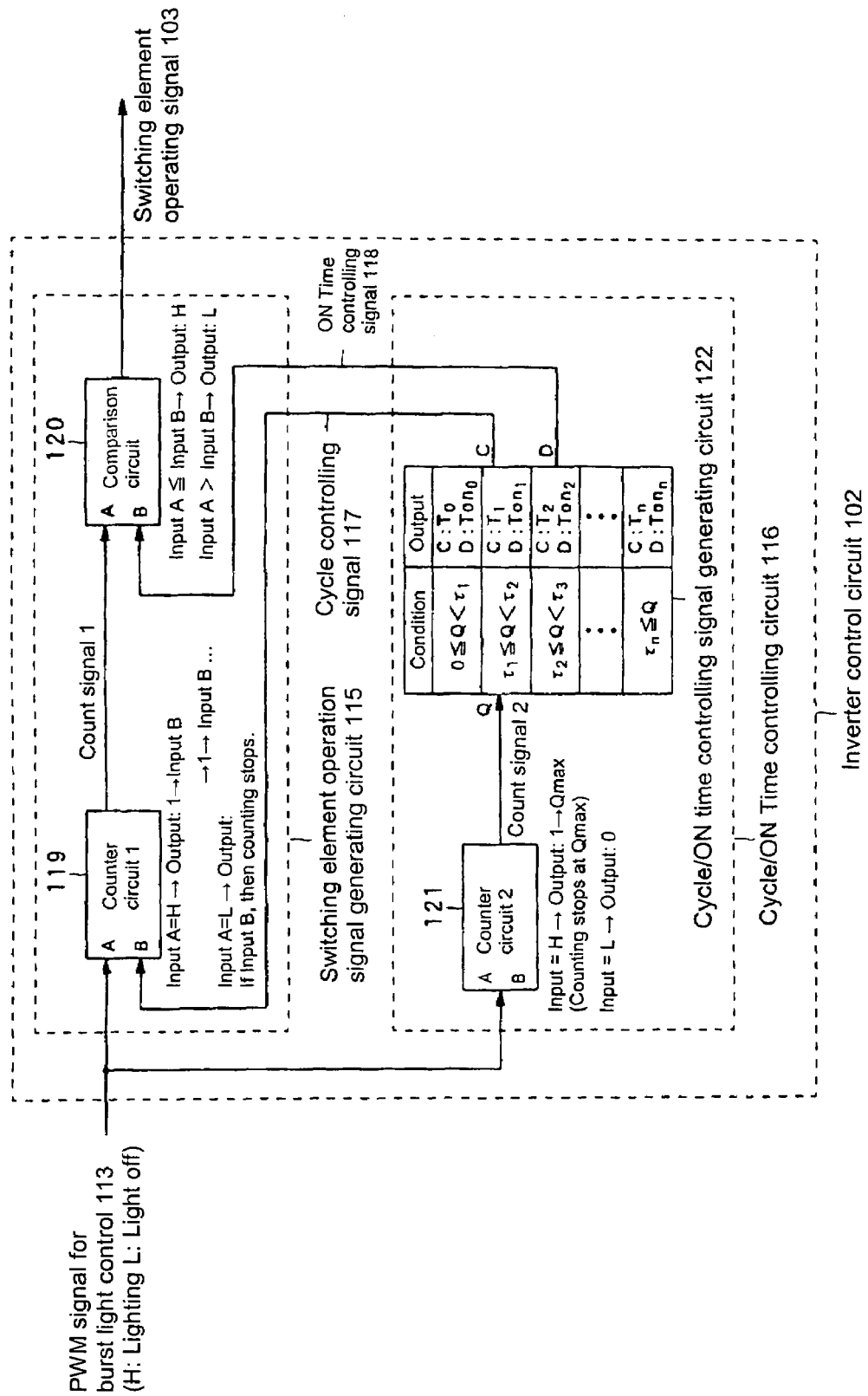
FIG. 22 is a block diagram showing the structure in an inverter control circuit 102 of a rare gas fluorescence lamp lighting apparatus shown in the FIG. 16.
Figure 23:
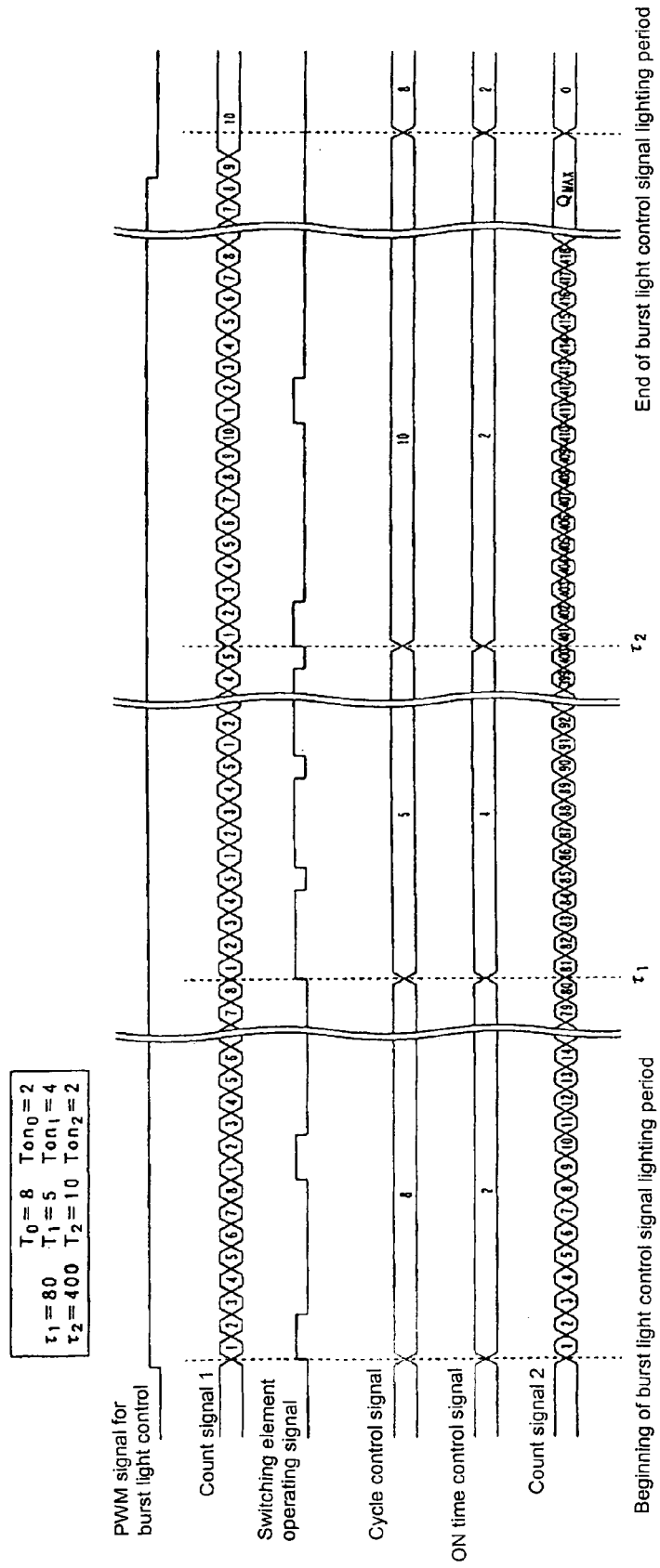
FIG. 23 is a timing chart showing a waveform of a signal of each part in an inverter control circuit 102.

FIG. 22 is a block diagram showing the structure of the inverter control circuit 102 of the rare gas fluorescence lamp lighting apparatus shown in FIG. 16, and FIG. 23 is a timing chart showing a waveform of a signal of each part in the inverter control circuit 102. The inverter control circuit 102 comprises the switching element operation signal generating circuit 115 and the cycle/ON Time controlling circuit 116. The PWM signal 113 for burst light control, the cycle controlling signal 117, and the ON Time controlling signal 118 are inputted into the switching element operation signal generating circuit 115 which outputs the switching element operating signal 103. The PWM signal 113 for burst light control is inputted into the cycle/ON Time controlling circuit 116 which outputs the cycle controlling signal 117 and the ON Time controlling signal 118. The switching element operation signal generating circuit 115 comprises a counter circuit (1) 119 and a comparison circuit 120. The PWM signal 113 for burst light control and the cycle controlling signal 117 are inputted into the counter circuit (1) 119 so as to output a count signal 1. The count signal 1 and the ON Time controlling signal 118 are inputted into the comparison circuit 120, which outputs the switching element operating signal 103. The cycle/ON Time controlling circuit 116 comprises a counter circuit (2) 121 and a cycle/ON time controlling signal generating circuit 122. The PWM signal 113 for burst light control is inputted into the counter circuit (2) 121, which outputs a count signal 2. Here, the PWM signal 113 for burst light control and the switching element operating signal 103 are binary logic signals, and the count signal 1, the count signal 2, the cycle controlling signal 117, and the ON time controlling signal 118 are integer signals.

Next, description of an operation of the switching element operation signal generating circuit 115 will be given below. When the PWM signal 113 for burst light control is changed from low to high, the counter circuit (1) 119 starts a count operation. The count signal 1 begins from a value of 1, and the value is incremented by one every fixed time interval. In the counter circuit (1) 119, when the count signal 1 reaches the value of the cycle controlling signal 117, the value returns to 1 and the same operation is repeated. In the comparison circuit 120, a comparison of the count signal 1 and the ON Time controlling signal 118 is performed, and in case of count signal 1≦ON Time controlling signal 118, the switching element operating signal 103 is set to high, and, in case of count signal 1>ON Time controlling signal 118, the switching element operating signal 103 is set to low. That is, a cycle of the switching element operating signal 103 is obtained by multiplying "time required to increment the count signal 1 by one" by "a valve of the cycle controlling signal 117", and the ON time (a period of high level) of the switching element operating signal 103 is obtained by multiplying "time required to increment the count value 1 by one" by "a of the ON Time controlling signal 118". If the PWM signal 113 for burst light control is changed from high to low, when the count signal 1 reaches the value of the cycle controlling signal 117, the counter circuit (1) 119 stops the count operation, so that the count signal 1 holds the value of the cycle controlling signal 117. That is, the switching element operating signal 103 holds the low level.

Next, description of an operation of the cycle/ON Time controlling circuit 116 will be given below. When the PWM signal 113 for burst light control is changed from low to high, the counter circuit (2) 121 starts a count operation. The counter circuit (2) 121 is operated, synchronizing with the counter circuit (1) 119. The count signal 2 starts from a value of 1, and the value is incremented by one every fixed time intervals. When the value thereof reaches the countable maximum value $Q_{MAX}$, the count signal 2 stops the count operation and holds the $Q_{MAX}$. The cycle/ON Time controlling circuit 116 compares the value of the count signal 2 with the integers $\tau_1, \tau_2,$ and $\tau_3$ and ... $\tau_n$ which are stored in the circuit. And two integer signals stored by relating them to the result are outputted as the cycle controlling signal 117 and the ON Time controlling signal 118. In particular, when the count signal 2 is set to Q, the cycle controlling signal 117 is set to C, and the ON Time controlling signal 118 is set to D, in case of $0 \leq Q < \tau_1$, $C=T_O$ and $D=T on_0$, and in case of $\tau_1 \leq Q < \tau_2$, $C=T_1$ and $D=Ton_1$, and in case of $\tau_n \leq Q$, $C=T_n$ and $D=Ton_n$. When the PWM signal 113 for burst light control is changed from high to low, the count signal 2 becomes 0 and the value thereof is held. Thus, the cycle of the switching element operating signal 103 and the time change of ON time can be arbitrarily changed by adjusting the value of integer signals $\tau_1$-$\tau_n$, $T_0$-$T_n$, and $Ton_0$-$Ton_n$. In addition, in the inverter control circuit 102 shown in FIG. 22, although the duty ratio of the switching element operating signal 103, which is replaced with "the value of the ON Time controlling signal"/"the value of the cycle controlling signal", is controlled because of the ease of circuit arrangement, this is equivalent to control of the duty ratio, and does not differ from the concept of the present invention.

Next, Description of the circuit operation of the inverter control circuit 102 shown in FIG. 22 will be given by using the timing chart shown in FIG. 23. Here, as shown in the FIG. 23, the values are set to $\tau_1=80$, $\tau_2=400$, $T_o=8$, $T_1=5$, $T_2=10$, $Ton_o=2$, $Ton_1=4$, and $Ton_2=2$. When the PWM signal 113 for burst light control is changed from low to high, the count signal 1 and the count signal 2 become a value of 1, and are incremented by one at fixed time intervals. In this example, although the cycle of count-up of the count signal 1 and the count signal 2 is the same, the cycle of the count signal 2 may be as much as that of n times the count signal 1. When the count signal 2 is 0–$\tau_1$ (=80), the cycle controlling signal 117 is 8 and the ON Time controlling signal 118 is 2. In the case of the count signal 1≦ON Time controlling signal 118 (=2), the switching element operating signal 103 becomes high, and the other signals become low. When the cycle controlling signal 117 becomes the value of 8, the count signal 1 becomes 1 and the same operation is repeated. When the count signal 2 becomes $\tau_1=80$, the cycle controlling signal 117 becomes 5, and the ON Time controlling signal 118 becomes 4. In the case of count signal 1, the ON Time controlling signal 118 (=4), the switching element operating signal 103 becomes high, and the other signals become low. When the cycle controlling signal 117 becomes a value of 5, the count signal 1 becomes 1 and the same operation is repeated. In the case of $2\tau_2=400$ in the count signal, the cycle controlling signal 117 becomes 10, and the ON Time controlling signal 118 becomes 2. In the case of the count signal 1≦ON Time controlling signal 118 (=2), the switching element operating signal 103 becomes high, and the other signals become low. When the cycle controlling signal 117 becomes a value of 10, the count signal 1 becomes 1 and the same operation is repeated. When the count signal 2 reaches the countable maximum $Q_{MAX}$, the value of $Q_{MAX}$ is held. When the PWM signal 113 for burst light control becomes low, the count signal stops a count operation, when the cycle controlling signal 117 reaches a value of 1, and at the same time the count signal 2 is reset to 0.

In addition, the frequency increase period, the duty ratio increase period, and the frequency and duty ratio increase period in the embodiments are not fixed beforehand, but a feedback control may be performed so as to detect the end of the entire light emission according to an output of an optical sensor provided at, for example, the portion corresponding to B of FIG. 14.

Figure 24:
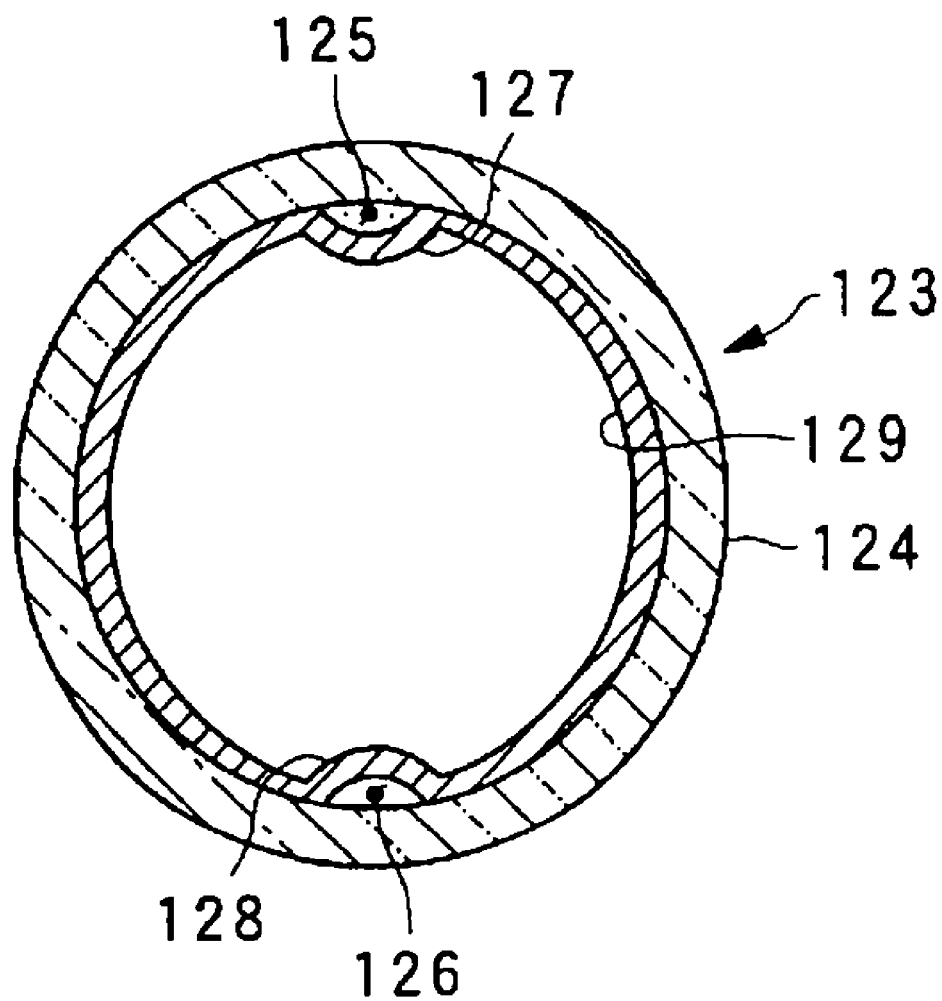
FIG. 24 is a cross-sectional view of a rare gas fluorescent lamp, taken along a plane perpendicular to the tube axis of the straight tube shaped rare gas fluorescence lamp 123, which has different structure from the rare gas fluorescence lamp shown in FIG. 3.

FIG. 24 is a cross-sectional view of a rare gas fluorescent lamp, taken along a plane perpendicular to the tube axis of the straight tube shaped rare gas fluorescence lamp 123, which has a different structure from the rare gas fluorescence lamp shown in FIG. 3 (refer to Japanese Patent Publication No. 2004-510302). The rare gas fluorescent lamp may be replaced with the lamps of the above-mentioned embodiment. As shown in this figure, two linear internal electrodes 125 and 126 which are disposed in a direction of a tube axis along the inner wall of a glass tube 124 are covered with dielectrics 127 and 128 which are made of glass, and fluorescent substance 129 is formed on the inner wall of the glass tube 124 and dielectrics 127 and 128. Thus, the rare gas fluorescence lamp of each embodiment may be not only a rare gas fluorescence lamp in which the external electrode extending in the direction of the tube axis on the external surface of the glass tube shown in FIG. 3 are disposed but also a rare gas fluorescence lamp in which the internal electrodes 125 and 126 are disposed in the direction of the tube axis along the inner wall of the glass tube 124 as shown in FIG. 24. The rare gas fluorescence lamp which has the structure shown in FIG. 3 or FIG. 24 is a lamp which belongs under the category of the dielectrics barrier discharge lamp in which discharge is carried out through dielectrics.

Furthermore, in this specification, although the lighting apparatus according to the embodiments has been explained referring to the rare gas fluorescence lamps, it is not limited to such fluorescence lamps in view of maintaining the uniformity of radiance distribution, and preventing high surge voltage. In addition to the lamp having the structure shown in FIG. 3 or 24, the technology according to the present invention, may be applied to any lamps, as long as electric discharge is generated in an electric discharge container, through at least one dielectrics provided between an electrode and an electric discharge container, and the excimer light generated by the electric discharge is utilized. Furthermore, application of the present invention is not limited to a liquid crystal back light or a lighting purpose.

The preceding description has been presented only to illustrate and describe exemplary embodiments of the lamp lighting apparatus according to the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope.

What is claimed is:

1. A lamp lighting apparatus comprising:
a glass tube;
electrodes provided in an axis direction of the glass tube; and an inverter circuit which apply a high voltage of an alternating current to the electrodes,
wherein the inverter circuit includes an inverter control circuit which outputs a switching element operating signal; a switching element circuit which converts a direct current voltage into an alternating voltage by ON/OFF controlling the switching element according to the switching element operating signal; and a boosting transformer which boosts the alternating voltage from the switching circuit, wherein a burst light control is carried out, by repeating a cycle of lighting and lighting off of the lamp and controlling a ratio of a lighting period and a non-lighting period, and
wherein a frequency of the switching element operating signal is higher than that in a steady state operating period, during at least part of period from a beginning of lighting according to the burst light control until the lamp emits light entirely, approximately in the axis direction of the lamp.

2. The lamp lighting apparatus according to claim 1, wherein the frequency of the switching element operating signal is gradually increased during an early stage of the at least part of period.

3. The lamp lighting apparatus according to claim 2, wherein the frequency of the switching element operating signal at a beginning of the at least part of period, is higher than that in the steady state operation period.

4. The lamp lighting apparatus according to claim 2, wherein the frequency of the switching element operating signal at a beginning of the at least part of period, is lower than that in the steady state operation period.

5. The lamp lighting apparatus according to claim 1, wherein the frequency is constant during the at least part of period.

6. The lamp lighting apparatus according to claim 1, wherein the higher frequency of the switching element operating signal is changed to that in the steady stage operation period, before the lamp emits light entirely, approximately in the axis direction of the lamp.

7. The lamp lighting apparatus according to claim 1, wherein the higher frequency of the switching element operating signal is changed to that in the steady stage operation period, after the lamp emits light entirely, approximately in the axis direction of the lamp.

8. The lamp lighting apparatus according to claim 1, wherein the higher frequency of the switching element operating signal is continuously changed to that in the steady stage operation period during a transition period from the at least part of period to the steady state operation period.

9. A lamp lighting apparatus comprising:
a glass tube;
electrodes provided in an axis direction of the glass tube; and an inverter circuit which apply a high voltage of an alternating current to the electrodes,
wherein the inverter circuit includes an inverter control circuit which outputs a switching element operating signal; a switching element circuit which converts a direct current voltage into an alternating voltage by ON/OFF controlling the switching element according to the switching element operating signal; and a boosting transformer which boosts the alternating voltage from the switching circuit, wherein a burst light control is carried out, by repeating a cycle of lighting and lighting off of the lamp and controlling a ratio of a lighting period and a non-lighting period, and
wherein a duty ratio of the switching element operating signal is higher than that in a steady state operating period, during at least part of period from a beginning of lighting according to the burst light control until the lamp emits light entirely, approximately in the axis direction of the lamp.

10. The lamp lighting apparatus according to claim 9, wherein the duty ratio of the switching element operating signal is gradually increased during an early stage of the at least part of period.

11. The lamp lighting apparatus according to claim 10, wherein the duty ratio of the switching element operating signal at a beginning of the at least part of period, is higher than that in the steady state operation period.

12. The lamp lighting apparatus according to claim 10, wherein the duty ratio of the switching element operating signal at a beginning of the at least part of period, is lower than that in the steady state operation period.

13. The lamp lighting apparatus according to claim 9, wherein the duty ratio is constant during the at least part of period.

14. The lamp lighting apparatus according to claim 9, wherein the higher duty ratio of the switching element operating signal is changed to that in the steady stage operation period, before the lamp emits light entirely, approximately in the axis direction of the lamp.

15. The lamp lighting apparatus according to claim 9, wherein the higher duty ratio of the switching element operating signal is changed to that in the steady stage operation period, after the lamp emits light entirely, approximately in the axis direction of the lamp.

16. The lamp lighting apparatus according to claim 9, wherein the higher duty ratio of the switching element operating signal is continuously changed to that in the steady stage operation period during a transition period from the at least part of period to the steady state operation period.

17. A lamp lighting apparatus comprising:
a glass tube;
electrodes provided in an axis direction of the glass tube; and an inverter circuit which apply a high voltage of an alternating current to the electrodes,
wherein the inverter circuit includes an inverter control circuit which outputs a switching element operating signal; a switching element circuit which converts a direct current voltage into an alternating voltage by ON/OFF controlling the switching element according to the switching element operating signal; and a boosting transformer which boosts the alternating voltage from the switching circuit, wherein a burst light control is carried out, by repeating a cycle of lighting and lighting off of the lamp and controlling a ratio of a lighting period and a non-lighting period, and
wherein a frequency and a duty ratio of the switching element operating signal are higher than that in a steady state operating period, during at least part of period from a beginning of lighting according to the burst light control until the lamp emits light entirely, approximately in the axis direction of the lamp.

18. The lamp lighting apparatus according to claim 17, wherein the frequency and the duty ratio of the switching element operating signal are gradually increased during an early stage of the at least part of period.

19. The lamp lighting apparatus according to claim 18, wherein the frequency and the duty ratio of the switching element operating signal at a beginning of the at least part of period, are higher than those in the steady state operation period.

20. The lamp lighting apparatus according to claim 18, wherein the frequency and the duty ratio of the switching element operating signal at a beginning of the at least part of period, are lower than those in the steady state operation period.

21. The lamp lighting apparatus according to claim 17, wherein the frequency and the duty ratio are constant during the at least part of period.

22. The lamp lighting apparatus according to claim 17, wherein the higher frequency and the higher duty ratio of the switching element operating signal are continuously changed to those in the steady stage operation period, and becomes that in the steady state before the lamp emits light entirely, approximately in the axis direction of the lamp.

23. The lamp lighting apparatus according to claim 17, wherein the higher frequency and the duty ratio of the switching element operating signal are changed to those in the steady stage operation period, before the lamp emits light entirely, approximately in the axis direction of the lamp.

24. The lamp lighting apparatus according to claim 17, wherein the higher frequency and the higher duty ratio of the switching element operating signal are changed to those in the steady stage operation period, after the rare gas fluorescence lamp emits light entirely, approximately in the axis direction of the lamp.

25. The lamp lighting apparatus according to claim 1, wherein the lamp is a rare gas fluorescence lamp, and in the glass tube, a rare gas which is selected from at least one of He, Ar, Xe and Kr is enclosed and a fluorescent substance is applied to an inner face thereof.

26. The lamp lighting apparatus according to claim 9, wherein the lamp is a rare gas fluorescence lamp, and in the glass tube, a rare gas which is selected from at least one of He, Ar, Xe and Kr is enclosed and a fluorescent substance is applied to an inner face thereof.

27. The lamp lighting apparatus according to claim 17, wherein the lamp is a rare gas fluorescence lamp, and in the glass tube, a rare gas which is selected from at least one of He, Ar, Xe and Kr is enclosed and a fluorescent substance is applied to an inner face thereof.

* * * * *